United States Patent
Numata

(10) Patent No.: US 10,254,400 B2
(45) Date of Patent: Apr. 9, 2019

(54) RADAR DEVICE

(71) Applicant: MITSUBISHI ELECTRIC CORPORATION, Chiyoda-ku (JP)

(72) Inventor: Kenichi Numata, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 208 days.

(21) Appl. No.: 15/123,787

(22) PCT Filed: Mar. 5, 2015

(86) PCT No.: PCT/JP2015/056515
§ 371 (c)(1),
(2) Date: Sep. 6, 2016

(87) PCT Pub. No.: WO2015/133575
PCT Pub. Date: Sep. 11, 2015

(65) Prior Publication Data
US 2017/0016988 A1    Jan. 19, 2017

(30) Foreign Application Priority Data
Mar. 6, 2014    (JP) .................. 2014-043660

(51) Int. Cl.
*G01S 7/02* (2006.01)
*G01S 7/36* (2006.01)
(Continued)

(52) U.S. Cl.
CPC .......... *G01S 13/9035* (2013.01); *G01S 7/023* (2013.01); *G01S 7/025* (2013.01); *G01S 7/36* (2013.01);
(Continued)

(58) Field of Classification Search
CPC ........ G01S 13/9035; G01S 7/025; G01S 7/36; G01S 2013/0245; G01S 2013/9082;
(Continued)

(56) References Cited

U.S. PATENT DOCUMENTS 3,953,857 A * 4/1976 Jenks ................ H01Q 1/281
                                                342/373
4,158,845 A * 6/1979 Pinson ................ H01Q 3/10
                                                244/3.16
(Continued)

FOREIGN PATENT DOCUMENTS

JP    51-32153        3/1976
JP    58-53202 A      3/1983
(Continued)

OTHER PUBLICATIONS

Extended European Search Report dated Sep. 27, 2017 in European Patent Application No. 15758888.0.
(Continued)

*Primary Examiner* — Frank J McGue
(74) *Attorney, Agent, or Firm* — Oblon, McClelland, Maier & Neustadt, L.L.P.

(57) ABSTRACT

A radar device includes: an aperture surface including element antennas and phase shifters; an antenna phase control unit for calculating phase amounts based on a beam orientation direction and a rotation angle of the aperture surface; an antenna driving control unit for setting a rotation angle to a rotation mechanism; a signal processing unit for detecting a target with the use of the radar receiver, setting at least one of the rotation angle of the aperture surface or the beam orientation direction in the antenna driving control unit and the antenna phase control unit, and calculating the level of competing cluttering with the use of an antenna pattern, to thereby determine propriety of the rotation angle; and a pattern calculating unit for calculating the antenna
(Continued)

pattern from the rotation angle of the aperture surface and from the beam orientation direction.

21 Claims, 27 Drawing Sheets

(51) Int. Cl.
 *H01Q 3/04* (2006.01)
 *H01Q 3/10* (2006.01)
 *H01Q 3/30* (2006.01)
 *G01S 13/90* (2006.01)
 *H01Q 1/28* (2006.01)
 *G01S 13/02* (2006.01)
(52) U.S. Cl.
 CPC .............. *H01Q 3/04* (2013.01); *H01Q 3/10* (2013.01); *H01Q 3/30* (2013.01); *G01S 2013/0245* (2013.01); *G01S 2013/9082* (2013.01); *H01Q 1/281* (2013.01)
(58) Field of Classification Search
 CPC .. H01Q 3/30; H01Q 3/10; H01Q 3/04; H01Q 1/281
 USPC .......................................................... 342/17
 See application file for complete search history.

(56) References Cited

U.S. PATENT DOCUMENTS

| | | | | |
|---|---|---|---|---|
| 4,823,136 | A * | 4/1989 | Nathanson | G01S 7/032 342/368 |
| 5,760,732 | A * | 6/1998 | Marmarelis | G01S 7/32 342/145 |
| 5,923,280 | A * | 7/1999 | Farmer | G01S 7/023 342/129 |
| 6,034,634 | A | 3/2000 | Karlsson et al. | |
| 6,166,689 | A * | 12/2000 | Dickey, Jr. | G01S 3/043 342/371 |
| 2006/0114164 | A1* | 6/2006 | Iluz | H01Q 1/18 343/757 |
| 2008/0136718 | A1* | 6/2008 | Tietjen | H01Q 1/1235 343/711 |
| 2013/0244710 | A1* | 9/2013 | Nguyen | G01S 13/0209 455/501 |

FOREIGN PATENT DOCUMENTS

| | | |
|---|---|---|
| JP | 62-113077 A | 5/1987 |
| JP | 7-5247 | 1/1995 |
| JP | 7-20710 U | 4/1995 |
| JP | 10-276030 A | 10/1998 |
| JP | 11-248837 A | 9/1999 |
| JP | 2000-266837 A | 9/2000 |
| JP | 2001-264420 A | 9/2001 |
| JP | 2002-257942 A | 9/2002 |
| JP | 2003-249808 A | 9/2003 |
| JP | 3565140 B2 | 9/2004 |
| JP | 3775383 B2 | 5/2006 |
| JP | 3790477 B2 | 6/2006 |
| JP | 3822079 B2 | 9/2006 |
| JP | 2010-197337 A | 9/2010 |
| WO | 2011/020470 A1 | 2/2011 |

OTHER PUBLICATIONS

P. Bradsell, "Phased Arrays in Radar", Electronics & Communication Engineering Journal, vol. 2 No. 2, XP 000114488, Apr. 1, 1990, pp. 45-51.
Office Action dated Feb. 28, 2017 in Japanese Patent Application No. 2016-506551 (with English language translation).
International Search Report dated Jun. 2, 2015 in PCT/JP2015/056515 filed Mar. 5, 2015.
Japanese Office Action dated Aug. 21, 2018 in Patent Application No. 2017-219636 (with English translation), 6 pages.

* cited by examiner

FIG. 3
(1) VERTICAL POSITION
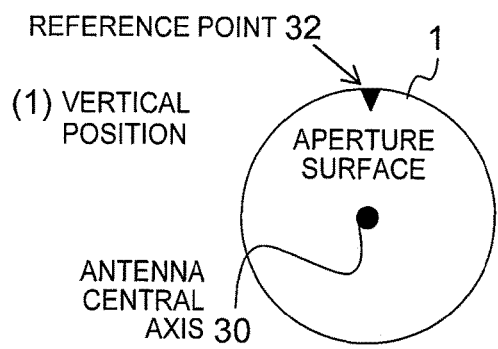
(a) FRONTAL VIEW (VERTICAL)
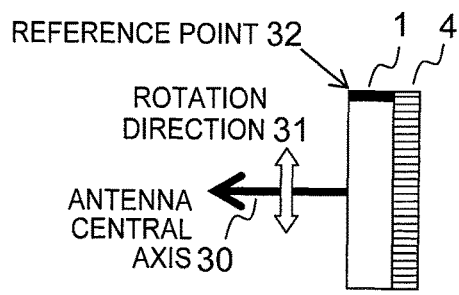
(b) SIDE VIEW (VERTICAL)
(2) OBLIQUE POSITION
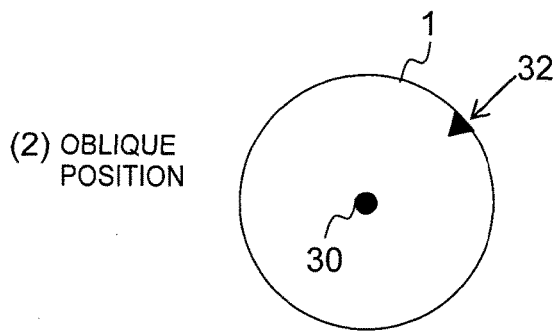
(a) FRONTAL VIEW (OBLIQUE)
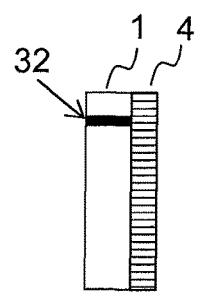
(b) SIDE VIEW (OBLIQUE)
(3) HORIZONTAL POSITION
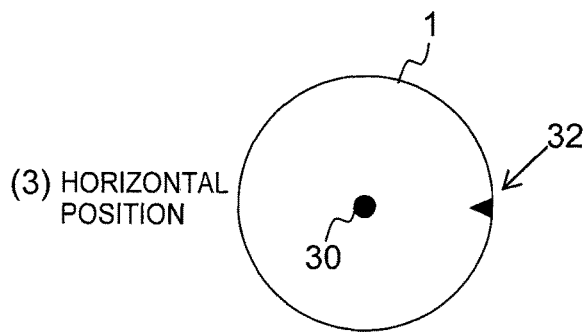
(a) FRONTAL VIEW (HORIZONTAL)
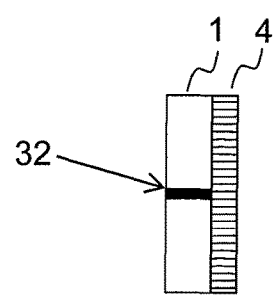
(b) SIDE VIEW (HORIZONTAL)

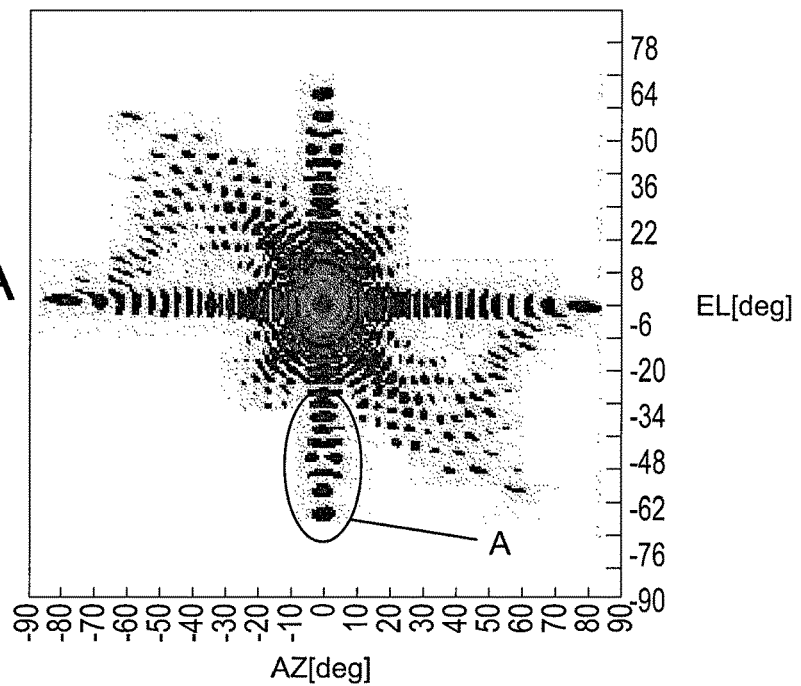
ANTENNA PATTERN PRIOR TO ROTATION
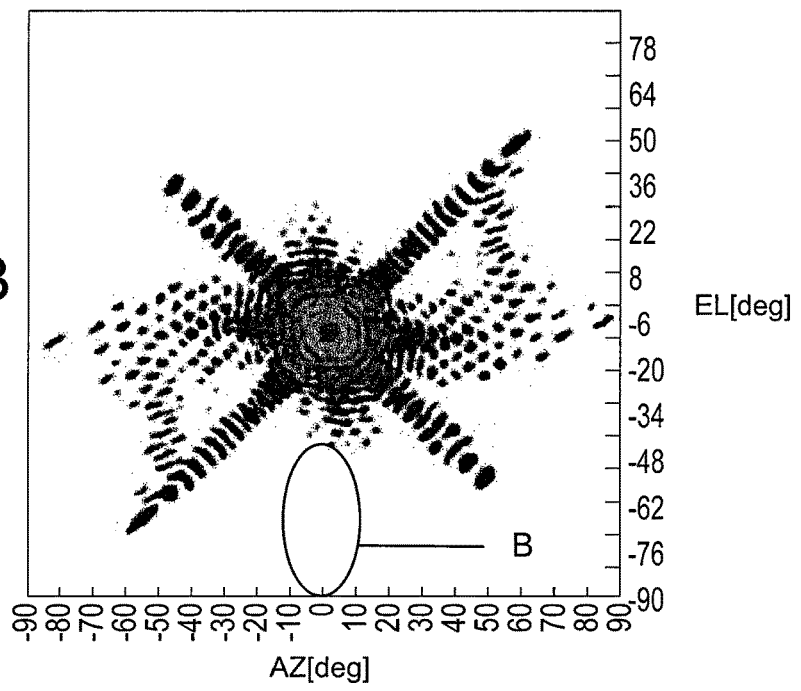
ANTENNA PATTERN AFTER ROTATION

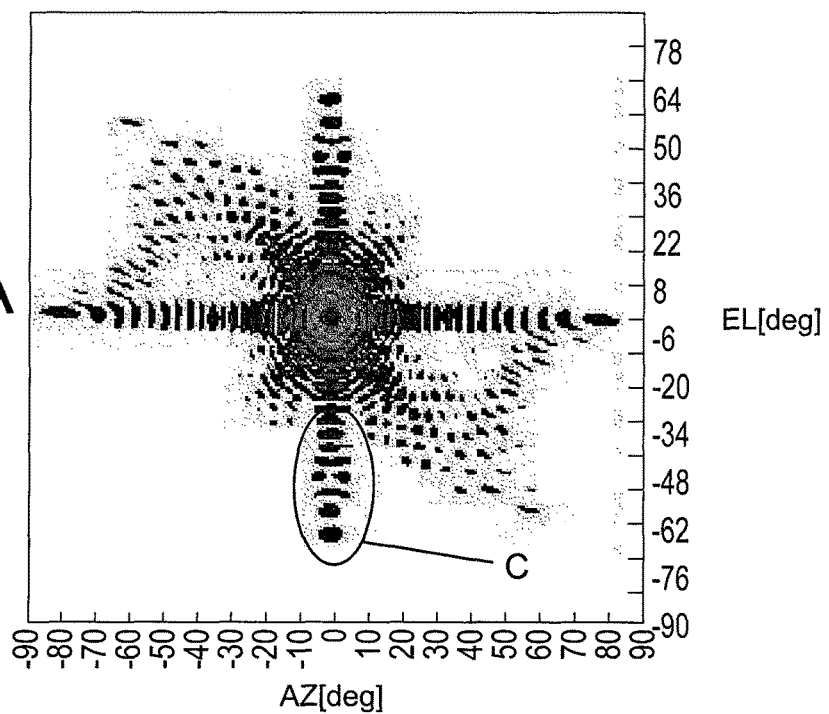
ANTENNA PATTERN PRIOR TO ROTATION
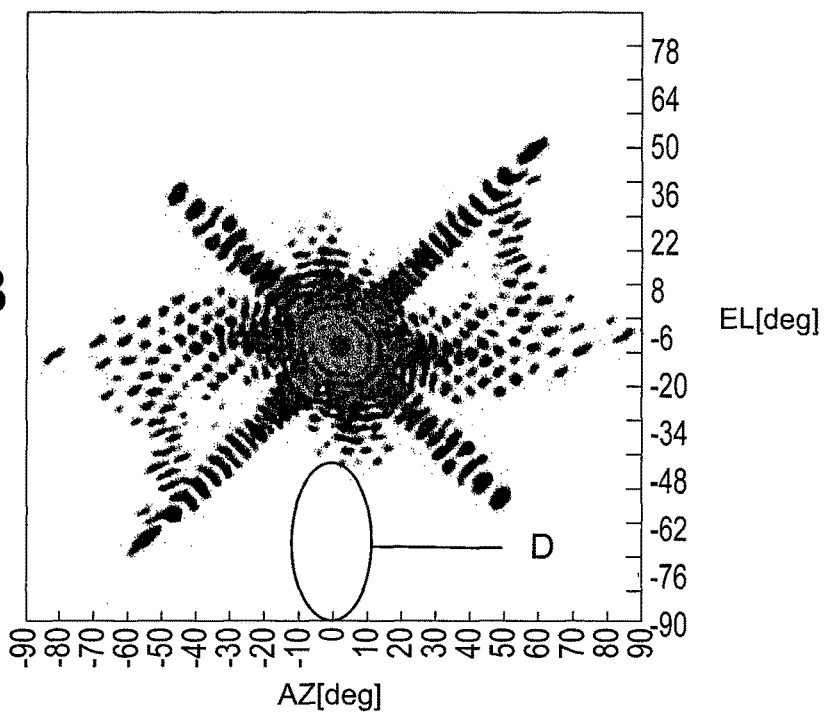
ANTENNA PATTERN AFTER ROTATION

ARRIVAL OF NORMAL ELECTROMAGNETIC WAVE

BRAGG LOBE

STATE CLOSE TO 90° INTERSECTION
BETWEEN APERTURE FLAT SURFACE
AND TARGET DIRECTION

STATE IN WHICH APERTURE FLAT
SURFACE IS NOT ORTHOGONAL TO
TARGET DIRECTION

RADAR DEVICE

TECHNICAL FIELD

The present invention relates to a radar device including an antenna that has a controllable aperture surface.

BACKGROUND ART

Currently, more and more radar systems are using a phased array antenna, which has a stationary aperture surface, and are configured to run a beam by electronic scanning. Controlling the rotation of the aperture surface to suppress cluttering, to remove jamming, and to suppress the influence of scattering due to electromagnetic waves arriving from a target (Bragg lobe) is therefore not practiced (for example, see Patent Literature 1 for cluttering suppression, Patent Literature 2 for jamming removal, and Patent Literature 3 for Bragg lobe elimination). With the aperture surface used in a stationary state, radar control utilizing the characteristics of polarized waves which are obtained by rotating the aperture surface is also not practiced.

Some phased array antennas use mechanical driving in combination. However, the purpose thereof is to expand the coverage, and the direction of mechanical driving is also limited to an azimuth (AZ) direction in which the coverage is expanded (see Patent Literature 4, for example).

CITATION LIST

Patent Literature

[PTL 1] JP 3775383 B2
[PTL 2] JP 3822079 B2
[PTL 3] JP 3565140 B2
[PTL 4] JP 3790477 B2

SUMMARY OF INVENTION

Technical Problem

Radars of the related art are configured to remove cluttering that accompanies a target by moving target indication (MTI) processing as described in Patent Literature 1, and do not suppress cluttering by controlling the aperture surface.

Sidelobe cancellers (SLCs) configured to remove jamming from a sidelobe are known as one of means effective for radars of the related art as described in Patent Literature 2. Suppressing jamming by controlling the aperture surface, on the other hand, is not practiced in radars of the related art.

As described in Patent Literature 3, radars of the related art are configured to minimize the influence of scattering due to electromagnetic waves from a target (hereinafter referred to as "Bragg lobe") to reduce the radar sectional area of the antenna, and emit electromagnetic waves in a phase opposite to the phase of scattered waves in order to achieve an array antenna device that is hard for an opponent radar to detect. Suppressing Bragg lobe by controlling the aperture surface, on the other hand, is not practiced in radars of the related art.

Radars of the related art are used with the polarization plane fixed to horizontal polarization or vertical polarization, which is a structure that does not allow the radars to make use of the characteristics of polarized waves. Controlling the aperture surface allows a radar to set its antenna to an arbitrary polarization plane, and thus enables the radar to utilize polarized waves.

Because of limitations that array antennas have, the coverage of active phased array antennas of the related art does not allow a radar to run abeam for scanning on sides or at an angle wider than the sides. Another problem is that, as a beam is run for scanning in a wide angle direction, the antenna gain drops in proportion to substantially the cosine of the scanning angle. Using mechanical driving in combination as described in Patent Literature 1 is one way to deal with this problem. This method involves rotating the aperture surface of the antenna in the AZ direction, and therefore needs to secure a space that prevents the antenna opening from interfering with other pieces of equipment. A resultant problem is that the method is not applicable to a narrow platform as in airplanes and the like. The method also has a problem in that lowering the failure rate is difficult because the whole load of the aperture surface applies to the rotational portion.

The present invention has been made in view of the described problems, and an object of the present invention is therefore to provide an aperture surface controlling-type radar device capable of suppressing cluttering, jamming signals, and Bragg lobe by controlling an aperture surface.

Solution to Problem

According to one embodiment of the present invention, there is provided a radar device, including: an aperture surface including element antennas and phase shifters, the element antennas being configured to emit and receive electromagnetic waves, the phase shifters being configured to set phases of signals to be transmitted to and received from the element antennas; an antenna phase control unit configured to calculate, based on a beam orientation direction and on a rotation angle of the aperture surface, phase amounts for setting appropriate phases to the phase shifters and for forming a beam; a gear configured to rotate the aperture surface; a motor configured to drive the gear to rotate the aperture surface; an amplifier configured to drive the motor; an antenna driving control unit configured to set the rotation angle of the aperture surface to the amplifier; a resolver configured to detect the rotation angle of the aperture surface; an exciter configured to generate transmission signals to be emitted from the antennas; a radar receiver configured to process the reception signals received by the element antennas with transmission signals reflected by a target; a signal processing unit configured to detect the target from the radar receiver, set a rotation angle of the aperture surface and a beam orientation direction in the antenna driving control unit and the antenna phase control unit, and calculate a level of cluttering that competes with the target captured by the radar with the use of an antenna pattern calculated by a pattern calculating unit, to thereby determine propriety of the rotation angle; and the pattern calculating unit configured to calculate the antenna pattern based on the rotation angle of the aperture surface and the beam orientation direction which are set by the signal processing unit.

Advantageous Effects of Invention

According to the present invention, cluttering, jamming signals, and Bragg lobe can be suppressed by rotating the aperture surface about the axis of the antenna, and the radar reflection sectional area of the aperture surface can be reduced by changing the direction of electromagnetic waves reflected on the aperture surface. In addition, the aperture surface is installed and rotated at an angle, thereby expanding the coverage while preventing a drop in antenna gain.

BRIEF DESCRIPTION OF DRAWINGS

FIGS. 3(a)(1)-(3) and FIGS. 3(b)(1)-(3) are frontal views and side views, respectively, for illustrating the configuration and operation of the aperture surface in the first embodiment to fourth embodiment of the present invention.

FIGS. 5A and 5B are diagrams for illustrating how the antenna gain in a sidelobe direction is reduced and the cluttering level is kept low by rotating the aperture surface according to the first embodiment of the present invention.

FIGS. 8A and 8B are diagrams for illustrating how the level of a jamming signal and the like is suppressed by rotating the aperture surface according to the second embodiment of the present invention.

DESCRIPTION OF EMBODIMENTS

First Embodiment

Figure 1:
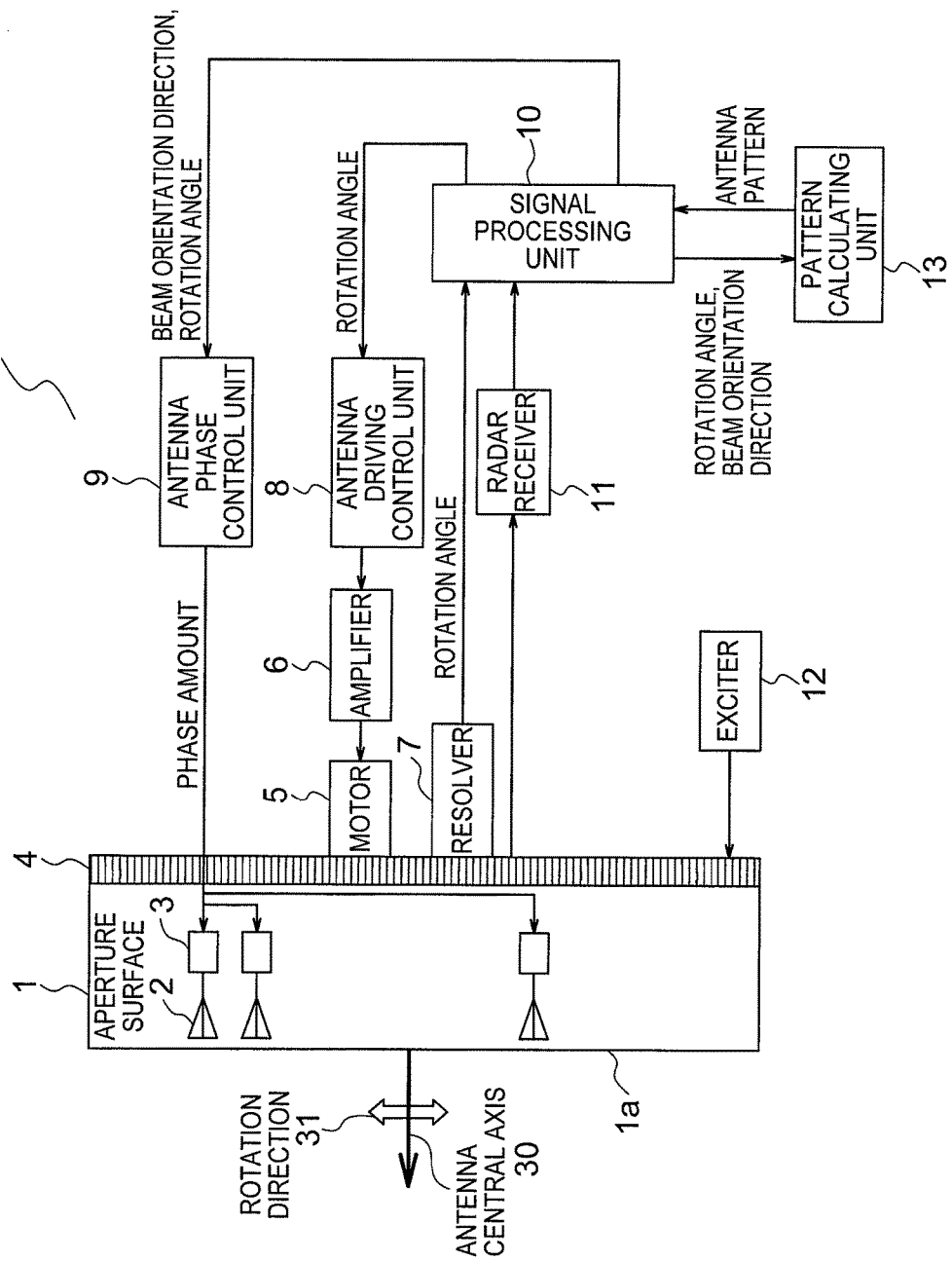
FIG. 1 is a diagram for illustrating a radar device according to a first embodiment of the present invention in which an aperture surface is controlled.

An aperture surface controlling radar device according to a first embodiment of the present invention is described below with reference to the drawings. FIG. 1 is a diagram for illustrating the configuration of an aperture surface controlling radar device 100 (hereinafter referred to as "radar device 100") according to the first embodiment.

The radar device 100 includes: an aperture surface 1, which includes therein a plurality of element antennas 2 configured to emit electromagnetic waves as transmission signals and receive reflected waves of the emitted electromagnetic waves as reception signals, and a plurality of phase shifters 3 connected to the element antennas 2 to set the phases of the transmission signals; a gear 4 provided on the opposite side from an electromagnetic wave transmitting/receiving side of the aperture surface 1; a motor 5 configured to rotate the aperture surface 1 via the gear 4; a resolver 7 configured to detect the rotation angle of the aperture surface 1; an antenna phase control unit 9 configured to calculate phase amounts necessary to form a beam based on the beam orientation direction and on the rotation angle of the aperture surface 1, and to output the phase amounts to the phase shifters 3; an antenna driving control unit 8 configured to set the rotation angle of the aperture surface 1; an amplifier 6 configured to amplify an output of the antenna driving control unit 8; a radar receiver 11 configured to perform signal processing on reception signals received by the element antennas 2; a signal processing unit 10 connected to the antenna phase control unit 9, the antenna driving control unit 8, the resolver 7, and the radar receiver 11 to execute various types of signal processing; a pattern calculating unit 13 configured to calculate an antenna pattern based on information about the rotation angle and the like which is exchanged with the signal processing unit 10; and an exciter 12 configured to generate transmission signals to be transmitted from the element antennas 2.

The signal processing unit 10 detects a target based on reception signals that have undergone signal processing performed by the radar receiver 11, sets the rotation angle of the aperture surface 1 and the beam orientation direction to the antenna driving control unit 8 and to the antenna phase control unit 9, and calculates the level of cluttering that competes with a target captured by the radar with the use of an antenna pattern calculated by the pattern calculating unit 13, to thereby determine the propriety of the rotation angle.

The operation of the radar device 100 is described next.

To detect a target, the signal processing unit 10 first determines the beam orientation direction of the radar, and issues an instruction that specifies the rotation angle of the aperture surface 1 and the beam orientation direction to the antenna phase control unit 9.

The antenna phase control unit 9 calculates, based on the specified rotation angle and beam orientation direction, for each of the plurality of phase shifters 3, a phase amount to be set to the phase shifter 3, and sets the calculated phase amount to the phase shifter 3.

Meanwhile, transmission signals generated by the exciter 12 are distributed among as many element antennas 2 and phase shifters 3 as there are inside the aperture surface 1, and are input to the phase shifters 3. The phase shifters 3 set appropriate phase amounts to the distributed transmission signals, and send the transmission signals to the element antennas 2, which then emit the transmission signals to the air.

With appropriate phase amounts set by the respective phase shifters 3, the transmission signals emitted from the respective element antennas 2 are combined in a desired beam orientation direction to form a beam.

The transmission signals are reflected by a target, thus generating reception signals. The reception signals are received by the respective element antennas 2 via the aperture surface 1, and are input to the respective phase shifters 3 to which optimum phase amounts are set.

The reception signals passed through the phase shifters 3 are combined inside the aperture surface 1, and the combined signal is sent via the radar receiver 11 to the signal processing unit 10, where target detection processing is performed.

Sidelobe cluttering that competes with a target located in the beam orientation direction needs to be reduced satisfactorily. To accomplish this, the sidelobe level of the antenna needs to be small in a direction where the conflict with the target occurs. Cluttering is unnecessary reflected waves reflected by the sea surface or the ground. Cluttering presents a hindrance to precise detection of a target, and it is therefore important to suppress cluttering.

Sidelobe cluttering that competes with a target is in a direction that satisfies Expression (1) and Expression (2).

$$Ftgt = \mod\left(\frac{2V\cos EL \cos AZ}{\lambda}, PRF\right) \quad \text{[Expression 1]}$$

where
Ftgt: the Doppler frequency of the target,
V: the velocity of a machine in which the radar device is installed (own machine),
λ: the wavelength of the frequency of the radar,
PRF: transmission repetition frequency,
EL: the direction of a sidelobe in an EL direction that competes with a target,
AZ: the direction of a sidelobe in the AZ direction that competes with the target.

$$Rtgt = \mod\left(\frac{H}{\sin EL}, \frac{c \cdot PRI}{2}\right) \quad \text{[Expression 2]}$$

where
Rtgt: the distance to the target,
H: the altitude of its own machine,
c: the velocity of light,
PRI: transmission repetition cycle,
EL: the direction of a sidelobe in the EL direction that competes with the target.

The antenna gain in the sidelobe direction that is calculated by Expressions (1) and (2) is obtained as follows.

The resolver 7 measures the rotation angle of the aperture surface 1, and sends the result of the measurement to the signal processing unit 10. The signal processing unit 10 sends the measured rotation angle and the beam orientation direction of the radar to the pattern calculating unit 13.

The pattern calculating unit 13 calculates the overall antenna gain of the aperture surface 1 from the antenna gain of each element antenna 2, the rotation angle, and the beam orientation direction, or reads the result of measuring or calculating the antenna gain which is stored in advance, and sends an antenna pattern to the signal processing unit 10.

The signal processing unit 10 uses the antenna pattern output from the pattern calculating unit 13 and the radar equation to calculate the level of sidelobe cluttering that competes with the target.

When the calculated sidelobe cluttering level is higher than a predetermined threshold, the signal processing unit 10 transmits an arbitrary rotation angle to the antenna driving control unit 8 to cause the motor 5 to rotate the aperture surface 1 by the arbitrary angle. This rotation angle and the beam orientation direction are used by the pattern calculating unit 13 to calculate an antenna pattern again, and the sidelobe cluttering level is calculated again from the result of the antenna pattern calculation. This operation is repeated until the sidelobe cluttering level is satisfactorily small compared to the level of the target, thereby calculating an optimum rotation angle. The threshold is set in advance based on the level of the target, and is stored in the signal processing unit 10.

The signal processing unit 10 sends the calculated optimum rotation angle to the antenna driving control unit 8, and to the antenna phase control unit 9 as well.

The antenna driving control unit 8 drives the motor 5 via the amplifier 6 so that the specified rotation angle is reached, thereby rotating the aperture surface 1 by the specified rotation angle.

The antenna phase control unit 9 takes into account the rotation of the aperture surface 1 by the specified rotation angle when calculating phase amounts to be set to the phase shifters 3 so that the radar beam is oriented correctly toward the target, and sets the calculated phase amounts to the phase shifters 3.

The control by the control unit 8 and the control by the control unit 9 are executed for each session of radar observation, thereby accomplishing a reduction in sidelobe that competes with the target.

In the case where competing cluttering cannot be estimated because the radar device 100 has not detected a target yet but background cluttering can be observed, an optimum rotation angle may be determined by comparing cluttering levels that are output from the radar receiver 11 at different rotation angles.

In the case where competing cluttering cannot be estimated and background cluttering cannot be observed, the rotation angle may be determined by calculating a cluttering level in the signal processing unit 10 based on an antenna pattern that is calculated for each rotation angle by the pattern calculating unit 13, and comparing the total cluttering at different rotation angles.

Figure 2:
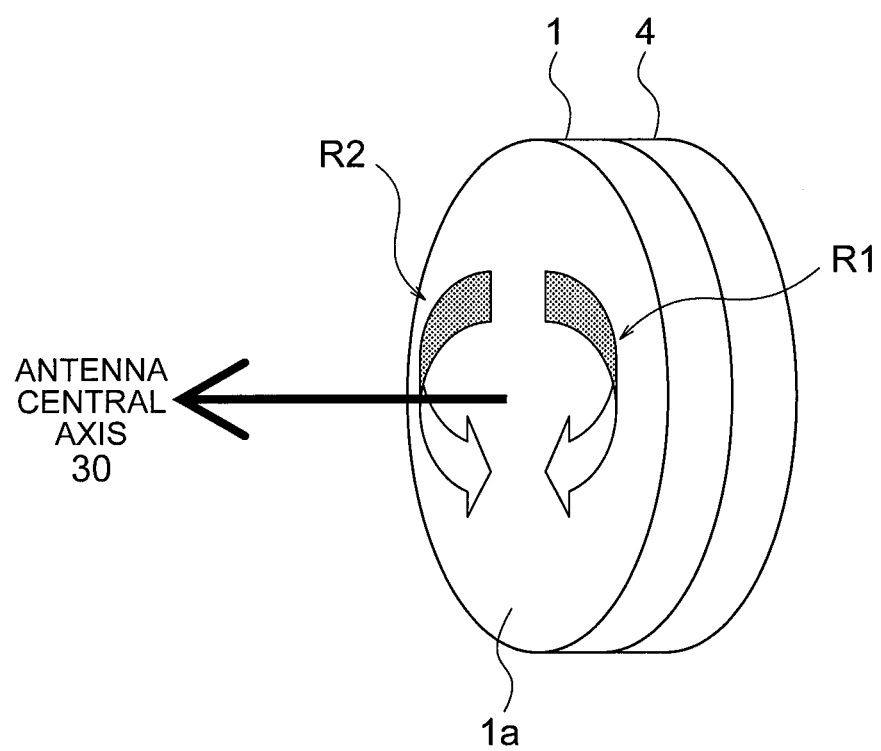
FIG. 2 is a diagram for illustrating the configuration and operation of the aperture surface in the first embodiment to fourth embodiment of the present invention.

FIG. 2 is a diagram for illustrating the configuration and operation of the aperture surface 1.

As illustrated in the perspective view of FIG. 2, the aperture surface 1 has a disc shape, and an aperture flat surface 1a of the aperture surface 1 has a circular shape. The aperture surface 1 rotates about an antenna central axis 30. The antenna central axis 30 is, as described later, a rotation axis about which the aperture surface 1 is rotated mechanically by the motor 5. The direction of the antenna central axis 30 matches with the direction of the rotation axis of the motor 5. In the example of FIG. 2, an axis that cuts across the center of the aperture in a direction perpendicular to the aperture flat surface 1a of the aperture surface 1 is the antenna central axis 30.

A rotation direction 31 of the aperture surface 1 can be a clockwise direction indicated by a symbol R1 and a counterclockwise direction indicated by a symbol R2 both. In the case where a phased array antenna is employed, the aperture surface 1 is an array antenna made up of a plurality of element antennas 2 (See FIG. 3).

The aperture surface 1 has varying characteristics with respect to the rotation direction 31 depending on the direction in which the element antennas 2 are arranged. Therefore, antenna characteristics, e.g., the antenna pattern are varied accordingly.

One of the characteristics is polarization plane. Specifically, the polarization plane varies depending on the direction in which the element antennas 2 are arranged. In this embodiment, where the aperture surface 1 is configured so as to rotate, the direction in which the element antennas 2 are arranged can be changed easily by rotating the aperture surface 1.

A brief description is given below on how the polarization plane changes as the aperture surface 1 is rotated.

For example, in the case where the polarization plane is set to vertical polarization when the aperture surface 1 is at a "vertical position" of part (1) of FIG. 3 in which a reference point 32 is facing straight up, the polarization plane changes to horizontal polarization when the reference point 32 rotates clockwise (in the direction R1) by 90° from there to reach a "horizontal position" of part (3) of FIG. 3, and changes to a median between vertical polarization and horizontal polarization when the reference point 32 rotates clockwise (in the direction R1) by 45° from there to reach an "oblique position" of part (2) of FIG. 3. Polarization in which the oscillation of electromagnetic waves is horizontal to the ground is referred to as "horizontal polarization", and polarization in which the oscillation of electromagnetic waves is vertical to the ground is referred to as "vertical polarization".

Rotating the aperture surface 1 about the antenna central axis 30 in order to utilize this change yields an effect in that a sidelobe competing with a target is reduced.

Figure 4:
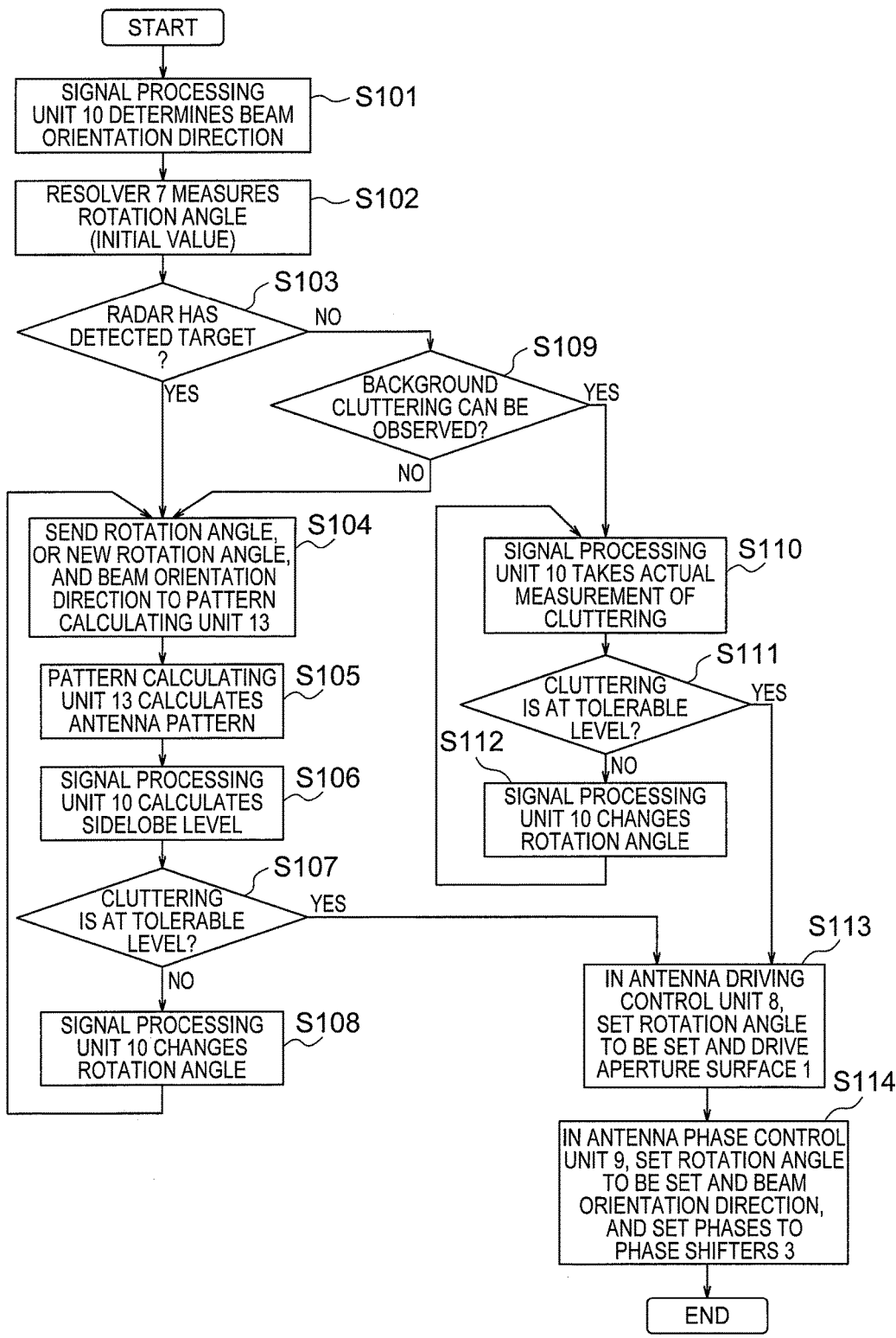
FIG. 4 is a diagram for illustrating the flow of controlling the aperture surface according to the first embodiment of the present invention.

FIG. 4 is a diagram for illustrating the flow of calculating the rotation angle of the aperture surface 1 and the phase amounts of the phase shifters 3 in the first embodiment, and is an illustration of the control described above. The calculation is described below with reference to the flow chart.

First, the signal processing unit 10 determines a beam orientation direction (S101). The resolver 7 measures the rotation angle of the aperture surface 1 and outputs the rotation angle to the signal processing unit 10 (S102). The signal processing unit 10 determines whether or not the radar has detected a target based on the result of processing by the radar receiver 11 (S103).

In the case where the radar has detected a target, the signal processing unit 10 sends the rotation angle and the beam orientation direction to the pattern calculating unit 13 (S104). The pattern calculating unit 13 calculates an antenna pattern based on the rotation angle and the beam orientation direction, and sends the antenna pattern to the signal processing unit 10 (S105). The signal processing unit 10 calculates the sidelobe level based on the received antenna pattern (S106), and determines whether or not cluttering is at a tolerable level (S107).

When it is determined in Step S107 that cluttering is not at a tolerable level, the signal processing unit 10 changes the rotation angle of the aperture surface 1 and returns to Step S104.

When it is determined in Step S107 that cluttering is at a tolerable level, the signal processing unit 10 proceeds to Step S113.

In the case where the radar has not detected a target in Step S103, on the other hand, whether or not background cluttering can be observed is determined (S109). The signal processing unit 10 proceeds to Step S104 in the case where cluttering cannot be observed. In the case where cluttering can be observed, the signal processing unit 10 takes an actual measurement of the cluttering level (S110). Whether or not cluttering is at a tolerable level is determined next (S111). The signal processing unit 10 proceeds to Step S113 when cluttering is at a tolerable level. In the case where cluttering is not at a tolerable level, on the other hand, the signal processing unit 10 changes the rotation angle of the aperture surface 1 (S112), and returns to Step S110.

In Step S113, the signal processing unit 10 outputs to the antenna driving control unit 8 a rotation angle to be set, and rotates the aperture surface 1 (S113).

The signal processing unit 10 next sets the rotation angle and the beam orientation direction in the antenna phase control unit 9, and sets the phase of the phase shifters 3 (S114).

FIG. 5 are diagrams for illustrating antenna patterns of a general antenna. The antenna pattern illustrated in FIG. 5A is one prior to the rotation of the aperture surface 1 by the antenna driving control unit 8, and the antenna pattern illustrated in FIG. 5B is one after the rotation of the aperture surface 1. In FIG. 5A, an example of a sidelobe that competes with a target is denoted by a symbol A. In FIG. 5B, an example of avoiding competition between the target and cluttering by nullifying the sidelobe that competes with the target is denoted by a symbol B.

As illustrated in FIG. 5A, an antenna pattern has a mixture of a region where the sidelobe level is high and a region where the sidelobe level is low. In the following description, a region where the sidelobe level is lowest, namely, a region where the sidelobe level is 0 is referred to as a region where the sidelobe is null. The region in FIG. 5A that is high in sidelobe level is oriented in the direction of cluttering, and this cluttering is accordingly competing with a target. The cluttering consequently hinders precise detection of the target, which makes the level of the cluttering non-tolerable. In such cases, the aperture surface 1 of the antenna is rotated following the flow of FIG. 4 in this embodiment. This orients the region where the sidelobe level is low or the region where the sidelobe is null toward the direction of the cluttering competing with the target as illustrated in FIG. 5B, thereby avoiding competition between the target and cluttering.

The radar device according to this embodiment is thus capable of detecting a target with precision by rotating the aperture surface 1 about the antenna central axis 30 to change the polarization plane and by performing control for setting the arrival direction of cluttering, which is an unnecessary wave, to a sidelobe nullifying direction to lower the level of sidelobe cluttering.

Second Embodiment

A second embodiment according to the present invention is described below with reference to the drawings.

Figure 6:
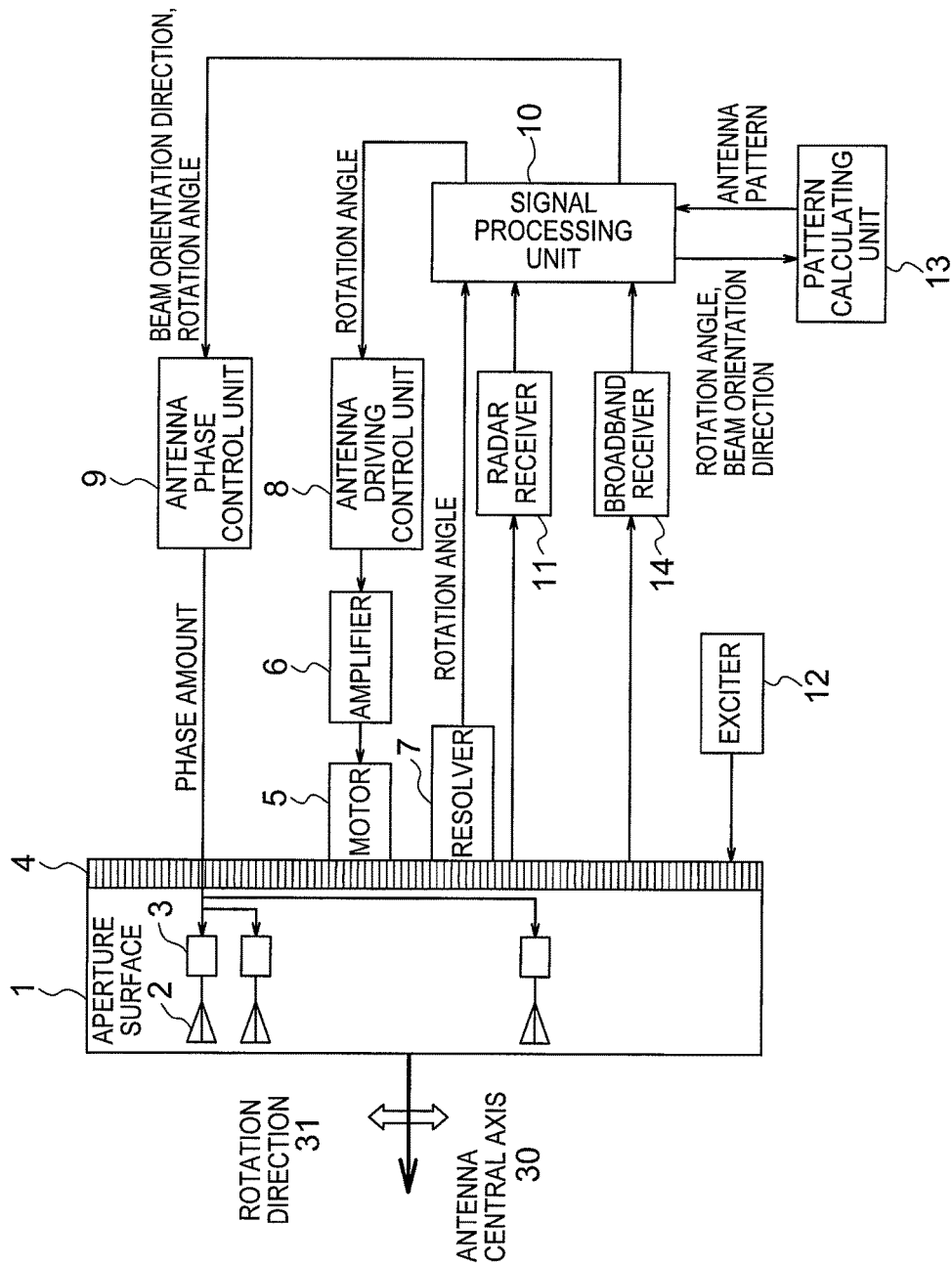
FIG. 6 is a diagram for illustrating a radar device according to a second embodiment of the present invention in which an aperture surface is controlled.

FIG. 6 is a diagram for illustrating a radar device according to the second embodiment. The radar device in FIG. 6 includes the aperture surface 1, the element antennas 2, the phase shifters 3 the gear 4, the motor 5, the amplifier 6, the resolver 7, the antenna driving control unit 8, the antenna phase control unit 9, the signal processing unit 10, the radar receiver 11, the exciter 12, the pattern calculating unit 13, and a broadband receiver 14. The configuration and operation of this aperture surface 1 are the same as those in the first embodiment which are illustrated in FIG. 2 and FIG. 3. The rest of the components that have the same functions as the components described in the first embodiment are denoted by the same reference numbers, and descriptions thereof are omitted.

In this embodiment, the broadband receiver 14 is capable of detecting radar signals transmitted from other platforms, communication signals, and other signals than ones to be received by its own radar, such as a jamming signal (hereinafter referred to as "jamming signal or the like"). The broadband receiver 14 detects the received power of a jamming signal or the like, and is capable of detecting the arrival direction of the jamming signal or the like based on the beam orientation direction at the time of reception.

The signal processing unit 10 in this embodiment executes, in addition to the operation described in the first embodiment, reception of the arrival direction and received power of the jamming signal or the like from the broadband receiver 14, and determination for determining whether or not a jamming signal or the like affects the operation of the radar based on the received power of the jamming signal or the like. When it is determined that the jamming signal or the like affects radar operation, the signal processing unit 10 determines the propriety of the rotation angle of the aperture surface 1 from the antenna gain of the jamming signal or the like which is calculated by the pattern calculating unit 13.

Figure 7:
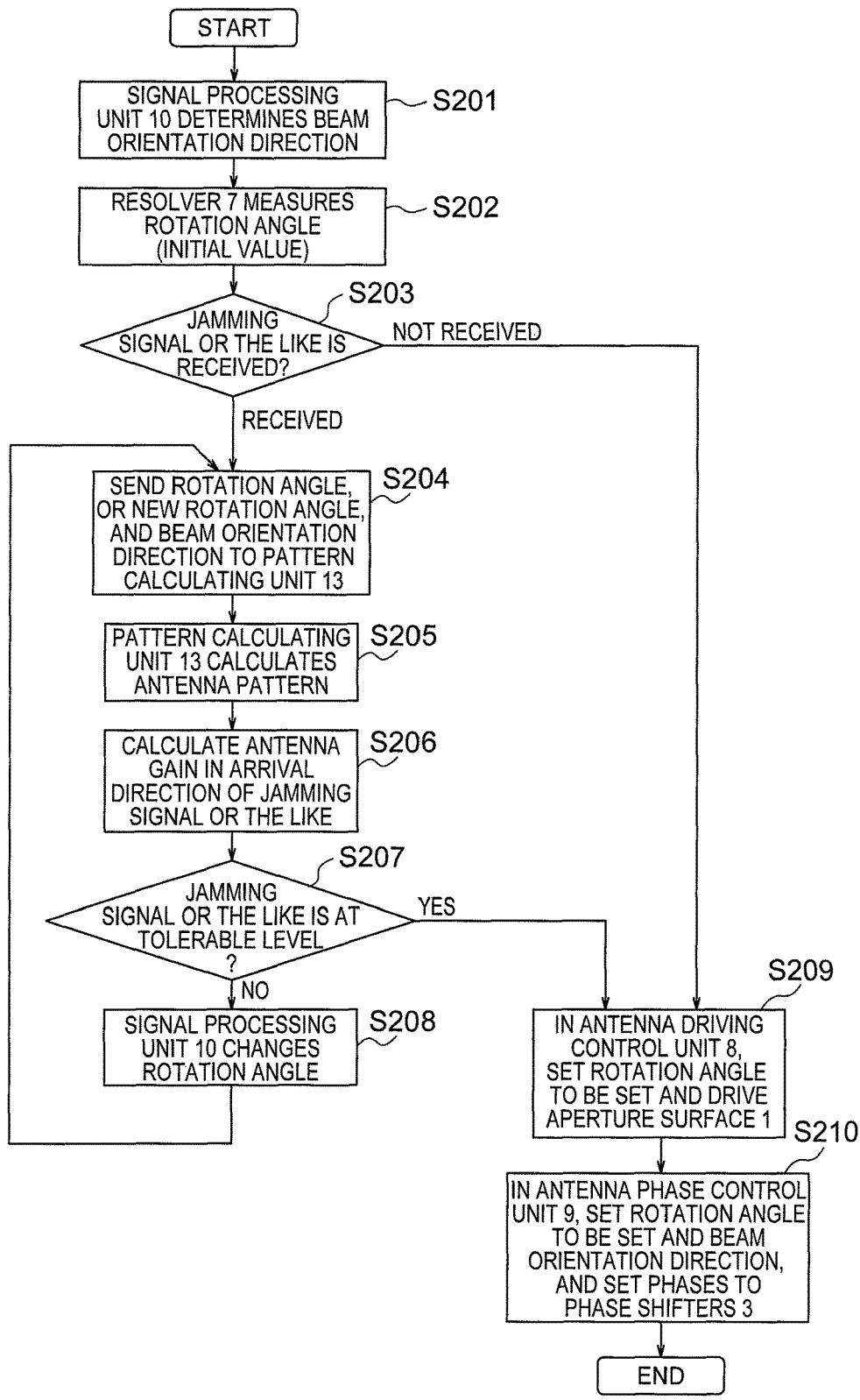
FIG. 7 is a diagram for illustrating the flow of controlling the aperture surface according to the second embodiment of the present invention.

FIG. 7 is a diagram for illustrating the flow of calculating the rotation angle of the aperture surface 1 and the phase amounts of the phase shifters 3 in the radar device according to the second embodiment. The operation of the radar device is described below with reference to FIG. 6 and FIG. 7.

The signal processing unit 10 determines whether the jamming signal or the like affects radar operation, based on the received power of the jamming signal or the like which is input by the broadband receiver 14 (S201 to S203).

In the case where the jamming signal or the like affects radar operation, the signal processing unit 10 reduces an antenna gain in the arrival direction of the jamming signal or the like in order to reduce the power of the jamming signal or the like.

The antenna gain in the arrival direction of the jamming signal or the like can be calculated by the pattern calculating unit 13 from the rotation angle of the aperture surface 1 and a beam orientation direction that is set by the signal processing unit 10. When the antenna gain in the arrival direction is large, the signal processing unit 10 rotates the aperture surface 1 by an arbitrary angle, and uses the pattern calculating unit 13 to calculate an antenna pattern again from information about the arbitrary rotation angle and about the beam orientation direction, and to calculate an antenna gain in the arrival direction again from the result of the antenna pattern calculation (S204 to S206).

This operation is repeated until the antenna gain in the arrival direction is small enough to prevent the jamming signal or the like from affecting radar operation, thereby calculating an optimum rotation angle (S207 and S208).

Step S209 and subsequent flow steps are for controlling the rotation angle of the aperture surface 1 and the phase amounts of the phase shifters 3 so that the radar can operate under a reduced influence of the jamming signal or the like, as Step S113 and subsequent flow steps of the first embodiment are.

FIG. 8 are diagrams for illustrating antenna patterns according to this embodiment. The antenna pattern illustrated in FIG. 8A is one prior to the rotation of the aperture surface 1 by the antenna driving control unit 8, and includes a jamming signal. The antenna pattern illustrated in FIG. 8B is one after the rotation of the aperture surface 1 in which the influence of jamming is reduced without an SLC by rotating the aperture surface 1 so that the arrival direction of the jamming signal or the like is oriented toward a nullifying direction of the antenna pattern. In FIG. 8A, an example of a direction from which the jamming signal or the like arrives is denoted by a symbol C. In FIG. 8B, an example of control in which the arrival direction of the jamming signal or the like is set to a nullifying direction by rotating the aperture surface 1 is denoted by a symbol D.

The radar device according to this embodiment is thus capable of detecting a target with precision by rotating the aperture surface 1 about the antenna central axis 30 to change the polarization plane, and by performing control for setting the arrival direction of a jamming signal or the like, which is an unnecessary wave, to a sidelobe nullifying direction.

Third Embodiment

A third embodiment according to the present invention is described below with reference to the drawings.

Figure 9:
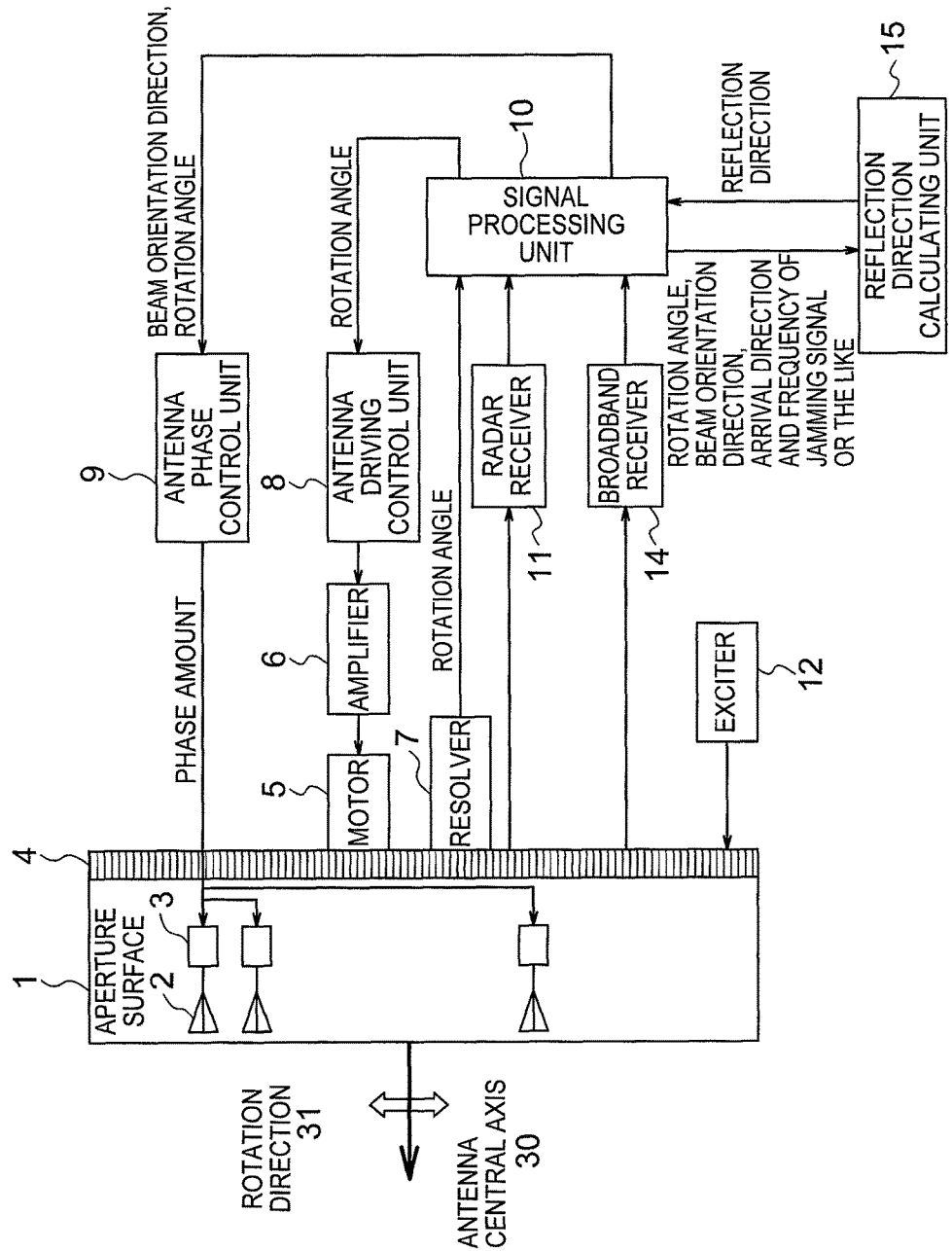
FIG. 9 is a diagram for illustrating a radar device according to a third embodiment of the present invention in which an aperture surface is controlled.

FIG. 9 is a diagram for illustrating a radar device according to the third embodiment. The radar device in FIG. 9 includes the aperture surface 1, the element antennas 2, the phase shifters 3, the gear 4, the motor 5, the amplifier 6, the resolver 7, the antenna driving control unit 8, the antenna phase control unit 9, the signal processing unit 10, the radar receiver 11, the exciter 12, the broadband receiver 14, and a reflection direction calculating unit 15. The configuration and operation of this aperture surface 1 are the same as those in the first embodiment which are illustrated in FIG. 2 and FIG. 3. The rest of the components that have the same functions as the components described in the second embodiment are denoted by the same reference numbers, and descriptions thereof are omitted.

The broadband receiver 14 in this embodiment is capable of finding out the received power and arrival direction of a jamming signal or the like as in the second embodiment, and is also capable of detecting the frequency of a jamming signal or the like. The reflection direction calculating unit 15 calculates a direction in which a jamming signal or the like is reflected by the aperture surface 1 based on arrangement information concerning the arrangement of the element antennas 2, and outputs the reflection direction to the signal processing unit 10.

Figure 11:
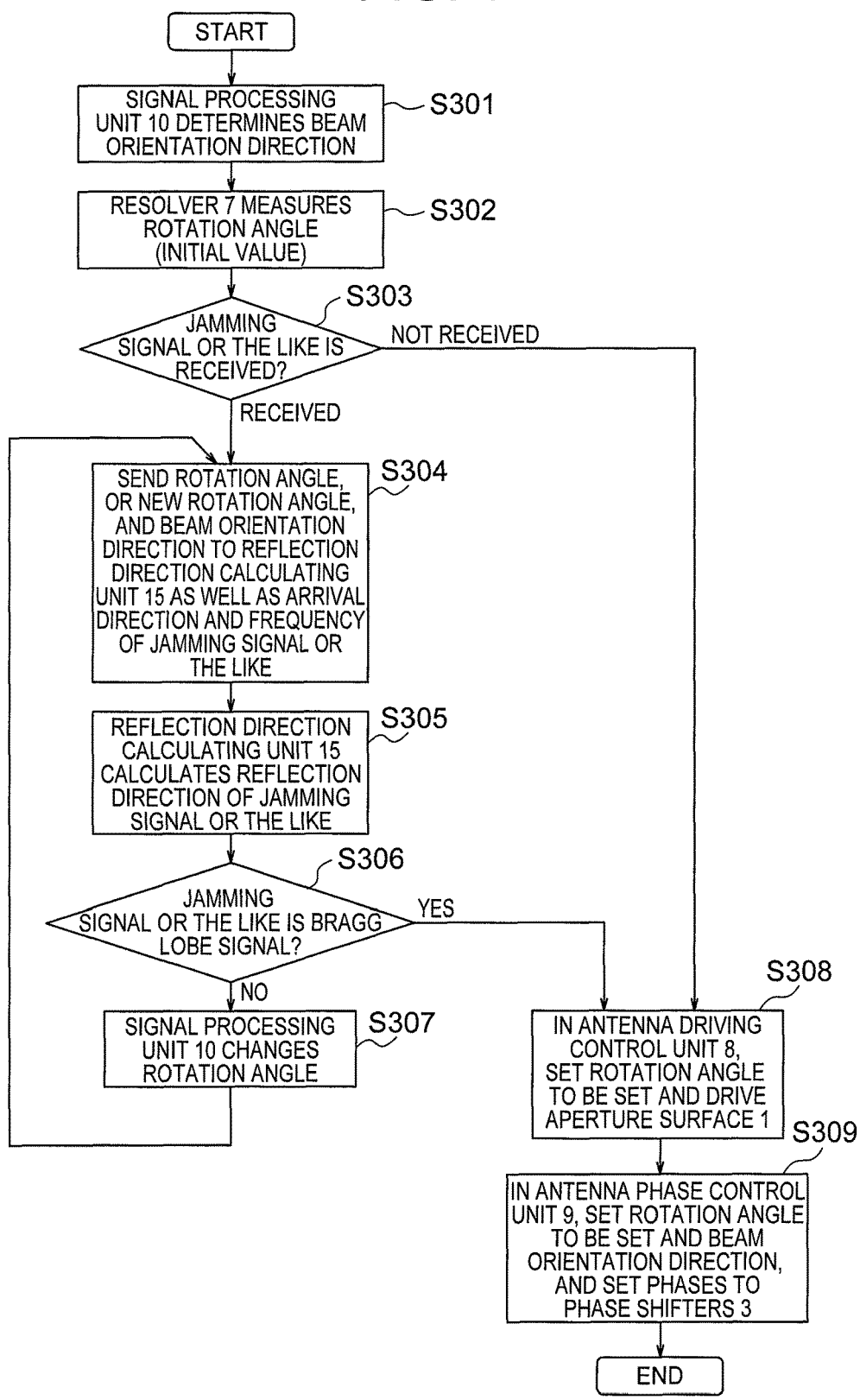
FIG. 11 is a diagram for illustrating the flow of controlling the aperture surface according to the third embodiment of the present invention.

FIG. 11 is a diagram for illustrating the flow of calculating the rotation angle of the aperture surface 1 and the phase amounts of the phase shifters 3 in the radar device according to the third embodiment. The operation of the radar device is described below with reference to FIG. 9 and FIG. 11.

The signal processing unit 10 determines whether a jamming signal or the like affects the operation of the radar from the received power of the jamming signal or the like (S301 to S303). The processing of Step S301 to Step S303 is the same as the processing of Step S201 to Step S203 in the first embodiment.

In the case where the jamming signal or the like affects radar operation, the signal processing unit 10 sends the arrival direction and frequency of the jamming signal or the like which are input by the broadband receiver 14 to the reflection direction calculating unit 15 (S304).

The reflection direction calculating unit 15 calculates a direction in which the jamming signal or the like is reflected by the aperture surface 1 based on the arrival direction and frequency of the jamming signal or the like and on the arrangement information of the element antennas 2 (S305), and outputs the calculated reflection direction to the signal processing unit 10.

The reflection direction calculation in the reflection direction calculating unit 15 is made based on how the element antennas 2 are arranged. Alternatively, the reflection direction may be calculated and stored in advance to be read out.

Figure 10A:
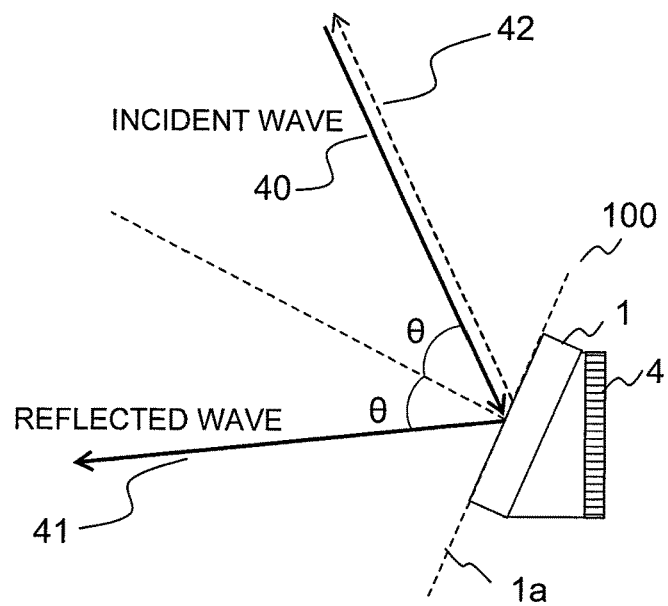
FIGS. 10A and 10B are diagrams for illustrating Bragg lobe to be suppressed in the radar device according to the third embodiment of the present invention in which the aperture surface is controlled.
Figure 10B:
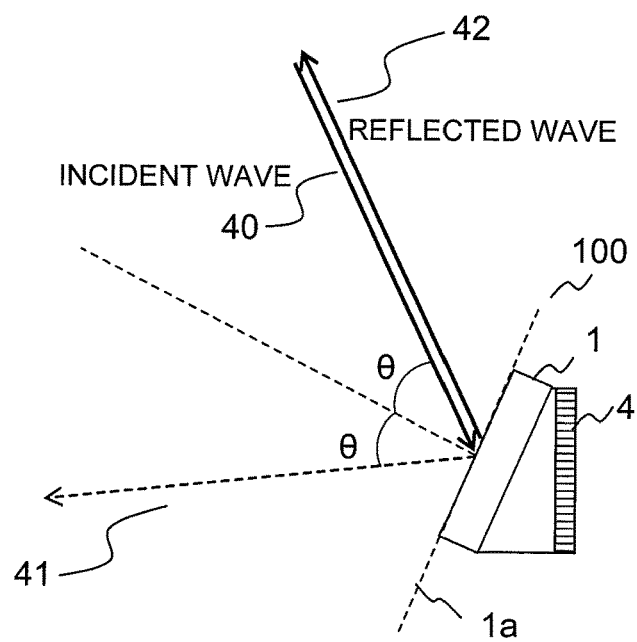

The signal processing unit 10 determines whether the reflection direction of the jamming signal or the like overlaps with the arrival direction of the jamming signal or the like (S306), and determines the jamming signal or the like as a Bragg lobe signal in the case where the reflection direction and the arrival direction overlap. Bragg lobe is a phenomenon in which the arrival direction of an arriving electromagnetic wave matches with a reflection direction in which the electromagnetic wave is reflected as illustrated in FIG. 10B. Bragg lobe occurs when three conditions, (1) the frequency of an arriving electromagnetic wave, (2) an angle between the arriving electromagnetic wave and the antenna aperture surface, and (3) the interval between element antennas, meet Bragg lobe conditions. In the case of Bragg lobe, the reflection sectional area of its own radar is large relative to an opponent radar and, in order to reduce the reflection sectional area, the rotation angle of the aperture surface 1 needs to be controlled so that the arrival direction and the reflection direction do not overlap. A detailed description on Bragg lobe is given with reference to FIG. 10. FIG. 10A is a diagram for illustrating the arrival of a normal electromagnetic wave, and FIG. 10B is a diagram for illustrating the case of Braga lobe. In FIG. 10A and FIG. 10B, an incident wave is denoted by a symbol 40, a reflected wave that is reflected at the same angle as an incident angle θ of the incident wave 40 is denoted by a symbol 41, and a reflected wave that is reflected in the incident direction of the incident wave 40 is denoted by a symbol 42. When the incident wave 40 enters the aperture flat surface 1a at the incident angle θ, the reflected wave 41 is normally reflected at θ, which is the same angle as the incident angle θ, as illustrated in FIG. 10A, and there is hardly the reflected wave 42, which is reflected in the incident direction of the incident wave 40. Accordingly, the power of the reflected wave 41 is large whereas the power of the reflected wave 42 is small. In the case where the frequency and arrival direction of the incident wave 40 and the interval between the element antennas 2 of the aperture surface 1 fulfill Bragg lobe conditions, on the other hand, the reflected wave 42 is reflected in the incident direction of the incident wave 40 as illustrated in FIG. 10B. In this case, there is hardly the reflected wave 41, which is reflected in the normal reflection direction, and the power of the reflected wave 41 is accordingly small. The power of the reflected wave 42, which is reflected in the incident direction of the incident wave 40, is large in contrast.

When the jamming signal or the like is determined as a Bragg lobe signal, the signal processing unit 10 rotates the aperture surface 1 by an arbitrary rotation degree (S307), and outputs the arbitrary rotation degree, the beam orientation direction, and information about the arrival direction and frequency of the jamming signal or the like to the reflection direction calculating unit 15. The reflection direction calculating unit 15 calculates the reflection direction of the jamming signal or the like, and the signal processing unit 10 again determines whether the jamming signal or the like is a Braga lobe signal (S306).

This operation is repeated until the jamming signal or the like is no longer a Bragg lobe signal, thereby calculating an optimum rotation angle.

Step S308 and subsequent flow steps are for controlling the rotation angle of the aperture surface 1 and the phase amounts of the phase shifters 3 so that the radar can operate under a reduced influence of jamming, similarly to Step S209 and subsequent flow steps of the second embodiment.

The radar device according to this embodiment is thus capable of detecting a target with precision by rotating the aperture surface 1 about the antenna central axis 30 to change the polarization plane, and by controlling the direction of a sidelobe to prevent a jamming signal or the like from becoming a Bragg lobe signal.

Fourth Embodiment

A fourth embodiment according to the present invention is described below with reference to the drawings.

Figure 12:
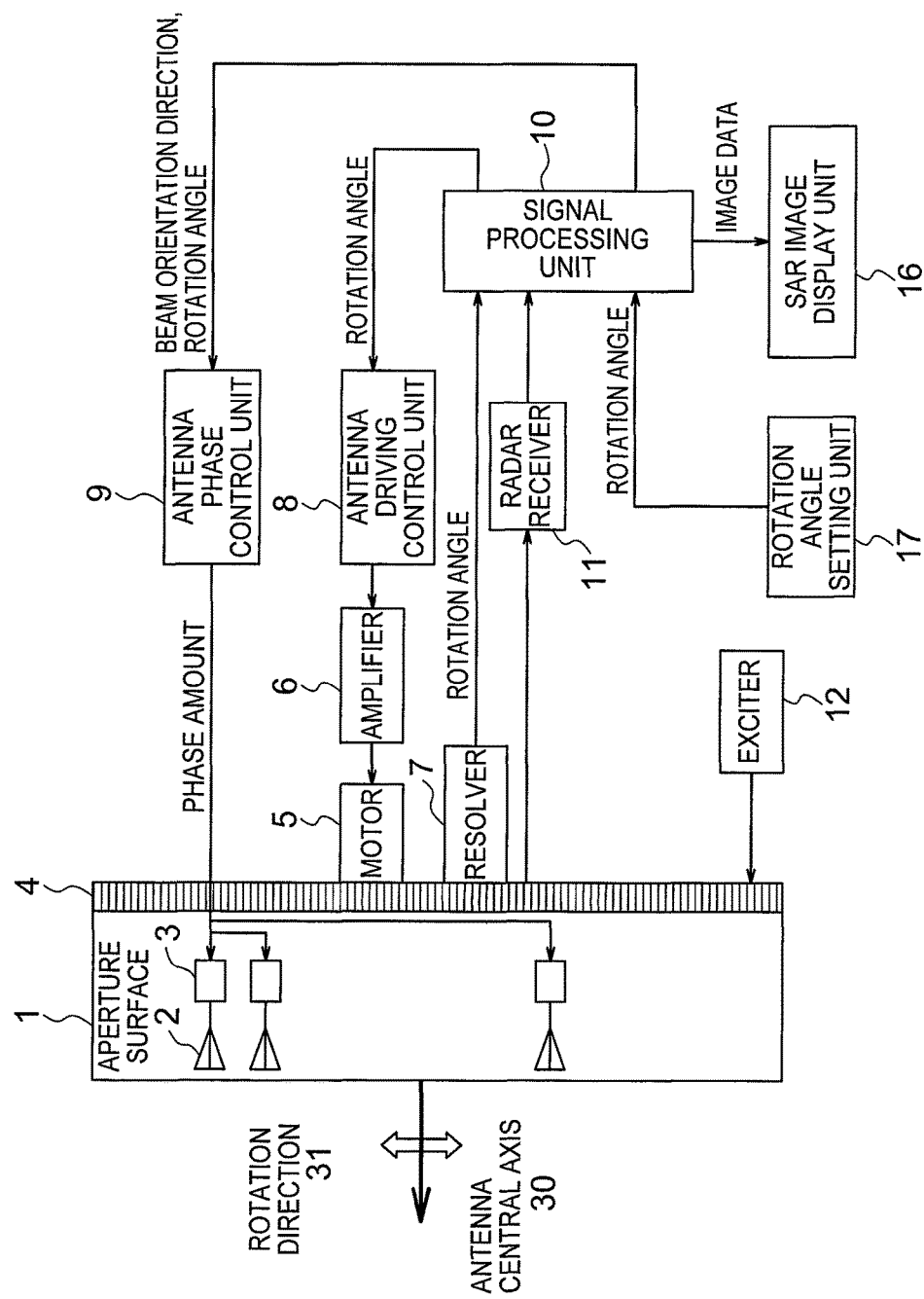
FIG. 12 is a diagram for illustrating a radar device according to a fourth embodiment of the present invention in which an aperture surface is controlled.

FIG. 12 is a diagram for illustrating a radar device according to the fourth embodiment. The radar device in FIG. 12 includes the aperture surface 1, the element antennas 2, the phase shifters 3, the gear 4, the motor 5, the amplifier 6, the resolver 7, the antenna driving control unit 8, the antenna phase control unit 9, the signal processing unit 10, the radar receiver 11, the exciter 12, a synthetic aperture radar (SAR) image display unit 16, and a rotation angle setting unit 17. The configuration and operation of this aperture surface 1 are the same as those in the first embodiment which are illustrated in FIG. 2 and FIG. 3. The rest of the components that have the same functions as the components described in the first embodiment are denoted by the same reference numbers, and descriptions thereof are omitted.

In this embodiment, the SAR image display unit 16 displays image data generated by the signal processing unit 10 when the radar is operating as a synthetic aperture radar (SAR). The displayed image data can be checked visually by an operator.

The rotation angle setting unit 17 sets a rotation angle by which the aperture surface 1 is to be rotated, based on an input from the operator. Specifically, when deciding that image data displayed on the SAR image display unit 16 is not acceptable, the operator inputs a rotation angle by which the aperture surface 1 is to be rotated to the rotation angle setting unit 17 so that optimum image data is obtained. The signal processing unit 10 uses the motor 5 to rotate the aperture surface 1 by the input rotation angle. For example, an input device for inputting a numerical value to the rotation angle setting unit 17, such as a keyboard or a numeric pad, may be provided to be used by the operator to input the rotation angle in the form of a numerical value to the rotation angle setting unit 17. In this case, the direction of rotation is determined in advance, e.g., clockwise (the direction R1 in FIG. 2) when the input value is positive and counter-clockwise (the direction R2 in FIG. 2) when the input value is negative. Alternatively, the operator may operate a rotating lever provided in the rotation angle setting unit 17 while looking at image data displayed on the SAR image display unit 16 so that the signal processing unit 10 rotates the aperture surface 1 by an angle corresponding to the amount of rotation of the rotating lever.

Figure 13:
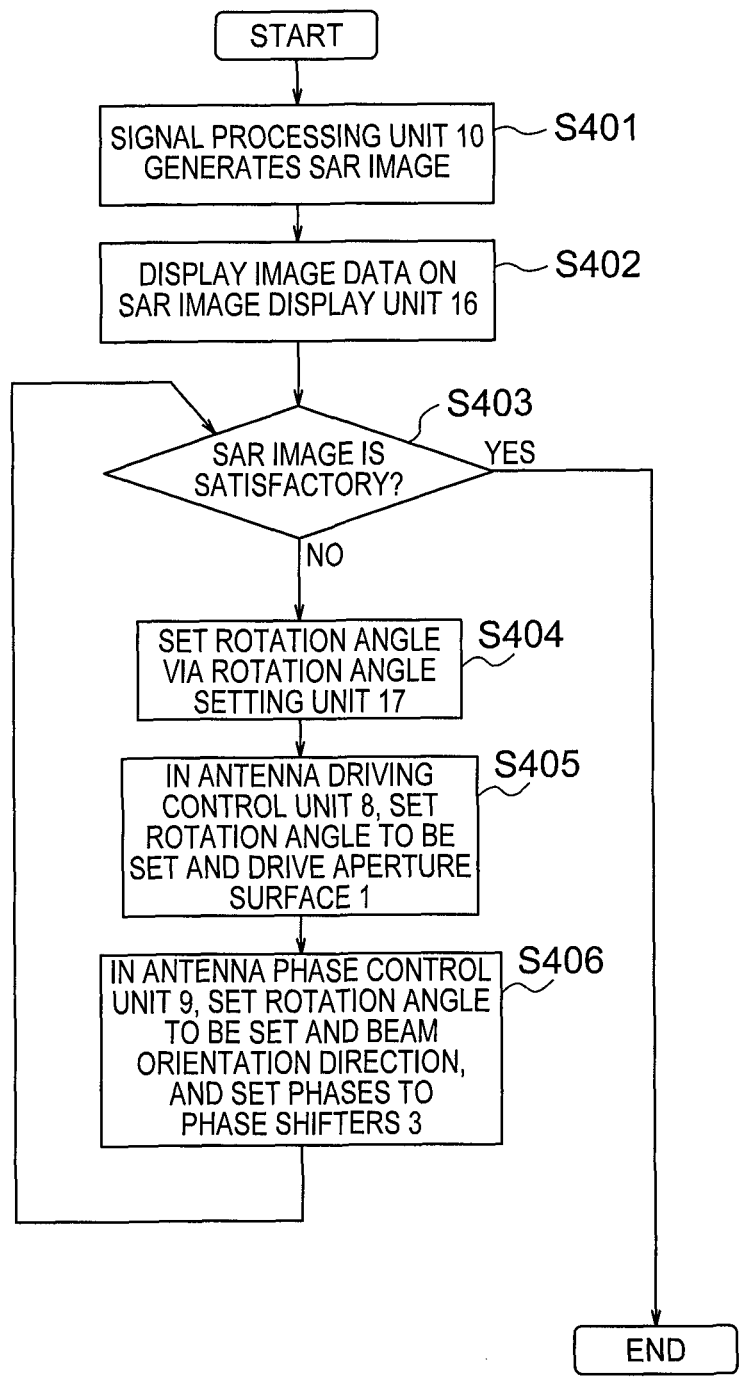
FIG. 13 is a diagram for illustrating the flow of controlling the aperture surface according to the fourth embodiment of the present invention.

FIG. 13 is a diagram for illustrating the flow of calculating the rotation angle of the aperture surface 1 and the phase amounts of the phase shifters 3 according to the fourth embodiment. The operation of the radar device is described below with reference to FIG. 12 and FIG. 13.

An operator of the radar device according to this embodiment visually checks image data displayed on the SAR image display unit 16 to determine whether or not the displayed image data is acceptable (S401 to S403).

When the displayed image data is not acceptable, the operator uses the rotation angle setting unit 17 to set a rotation angle that yields optimum image data (S404). A main parameter of synthetic aperture radars is a polarized wave, and the rotation angle of the aperture surface 1 of the radar and the polarization direction of an electromagnetic wave are described through the example of FIG. 3. In this embodiment, the polarization direction of the aperture surface 1 changes as the aperture surface 1 is rotated. A case in which the polarization of an electromagnetic wave transmitted to/received from the aperture surface 1 is vertical polarization when the reference point is set at the vertical position of part (1) of FIG. 3 as illustrated in a frontal view (vertical) of FIG. 3(a) of part (1) and a side view (vertical) of FIG. 3(b) of part (1) is discussed as an example.

The polarization of an electromagnetic wave transmitted to/received from the aperture surface 1 changes to horizontal polarization when the reference point is set at the horizontal position of part (3) of FIG. 3 as illustrated in a frontal view (horizontal) of FIG. 3(a) of part (3) and a side view (horizontal) of FIG. 3(b) of part (3). The polarization of an electromagnetic wave transmitted to/received from the aperture surface 1 can be set to oblique polarization by rotating the aperture surface 1 so that the reference point is put in an oblique direction of part (2) of FIG. 3 which is an intermediate state between vertical polarization and horizontal polarization as illustrated in a frontal view (oblique) of FIG. 3(a) of part (2) and a side view (oblique) of FIG. 3(b) of part (2).

The rotation angle set in the rotation angle setting unit 17 is input to the signal processing unit 10, which outputs the rotation angle to the antenna driving control unit 8. The signal processing unit 10 also outputs the input rotation angle and the beam orientation direction to the antenna phase control unit 9, to thereby control the rotation angle of the aperture surface 1 and the phase amounts of the phase shifters 3.

The radar device according to this embodiment is thus capable of controlling with ease the polarization direction of an electromagnetic wave so that the wave is polarized in any direction by controlling the rotation angle of the aperture surface 1 when the radar is operating as a synthetic aperture radar, which enables the radar device to obtain a high quality image by selecting optimum polarization. The radar device is also capable of suppressing cluttering, removing jamming signals, and suppressing Bragg lobe by performing control in which the arrival direction of an unnecessary wave is set to a sidelobe nullifying direction, thus obtaining an image free of the influence of the unnecessary wave.

Fifth Embodiment

A fifth embodiment according to the present invention is described below with reference to the drawings.

Figure 14:
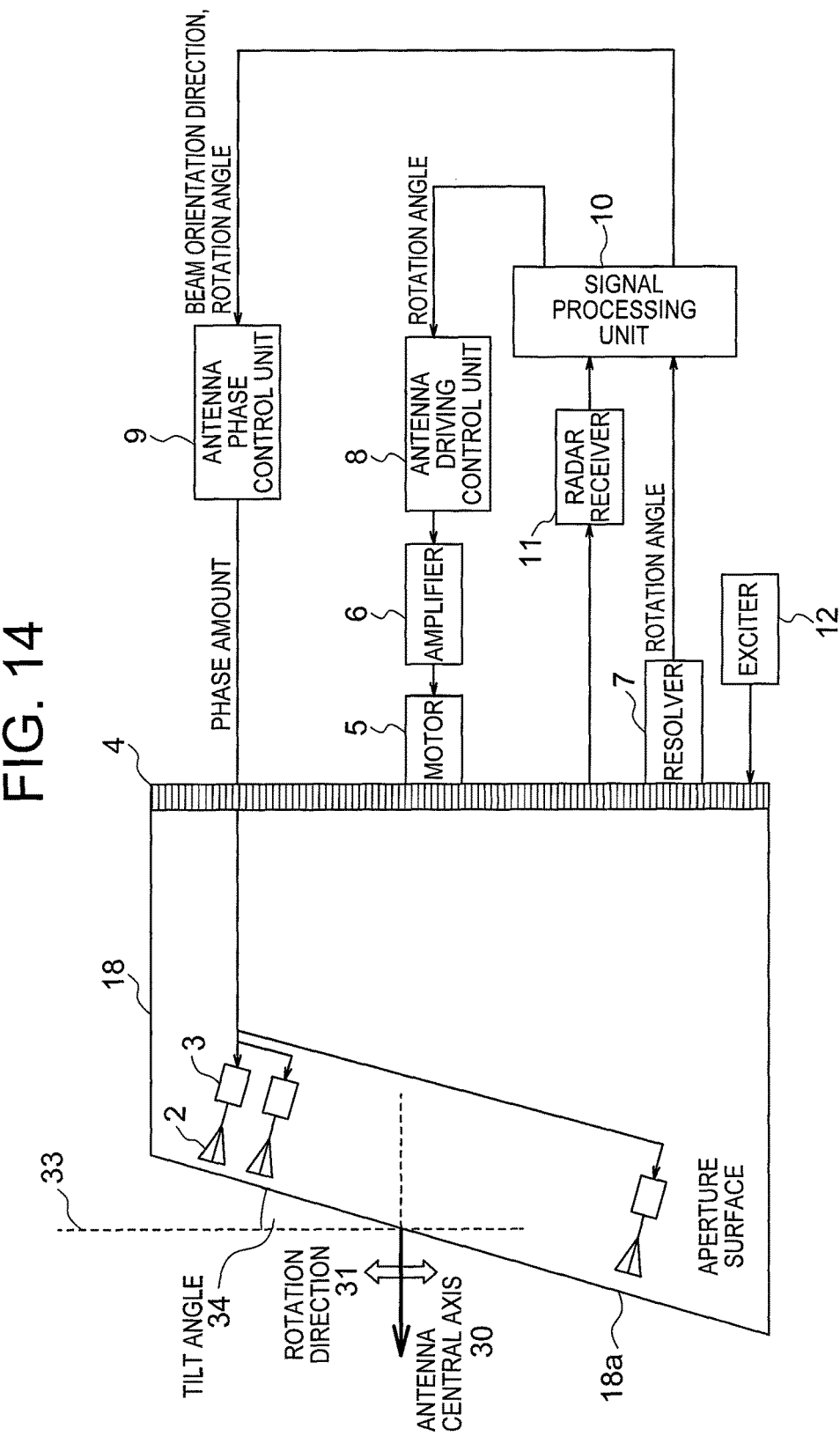
FIG. 14 is a diagram for illustrating a radar device according to a fifth embodiment of the present invention in which an aperture surface is controlled.

FIG. 14 is a diagram for illustrating the configuration of a radar device according to the fifth embodiment. The radar device in FIG. 14 includes an aperture surface 18, the element antennas 2, the phase shifters 3, the gear 4, the motor the amplifier 6, the resolver 7, the antenna driving control unit 8, the antenna phase control unit 9, the signal processing unit 10, the radar receiver 11, and the exciter 12.

Though not shown, the radar device of the fifth embodiment includes, when necessary, the pattern calculating unit 13, the broadband receiver 14, the reflection direction calculating unit 15, the SAR image display unit 16, and the rotation angle setting unit 17, which are described in the first embodiment to the fourth embodiment.

In FIG. 14, the rest of the components that have the same functions as the components described in the first embodiment to the fourth embodiment are denoted by the same reference numbers, and descriptions thereof are omitted.

An aperture flat surface 18a of the aperture surface 18 in this embodiment has a disc shape as the aperture flat surface 1a of the aperture surface 1 described in the first embodiment to the fourth embodiment does. However, the aperture surface 18 is longer in the axial direction than the length in the axial direction of the disc-shaped aperture surface 1 described in the first embodiment to the fourth embodiment, which makes the overall shape of the aperture surface 18 a substantially columnar shape. The aperture surface 18 rotates about the antenna central axis 30 set in a horizontal direction. The direction of the antenna central axis 30 matches with the direction of the rotation axis of the motor 5, which rotates the aperture surface 18. However, the shape of the aperture surface 18 in this embodiment is trapezoidal in sectional side view as illustrated in FIG. 14. The aperture flat surface 18a of the aperture surface 18 is accordingly disposed at a constant angle of inclination (hereinafter referred to as "tilt angle 34") with respect to an axis 33, which is orthogonal to the antenna central axis 30. The gear 4 side of the aperture surface 18, on the other hand, is placed so as to be orthogonal to the antenna central axis 30.

The shape of the aperture surface 18 which is columnar in FIG. 14 is not limited thereto and may be disc-like as is the case for the aperture surface 1 of the first embodiment to the fourth embodiment. However, in that case also, the aperture surface 18 is disposed at the tilt angle 34 with respect to the axis 33 orthogonal to the antenna central axis 30.

In this embodiment, where the aperture surface 18 is thus disposed at the tilt angle 34, the antenna coverage of the radar device of this embodiment can be expanded by an amount expressed in Expression (3) by rotating the aperture surface 18 and using electronic scanning and mechanical driving in combination.

$$\theta max = \varphi max + \eta \quad [\text{Expression 3}]$$

where

θmax: the maximum coverage (in the AZ direction and the EL direction both) when electronic scanning and mechanical driving are used in combination, Ψmax: the maximum coverage (in the AZ direction and the EL direction both) when electronic scanning is used, η: tilt angle.

Figure 15:
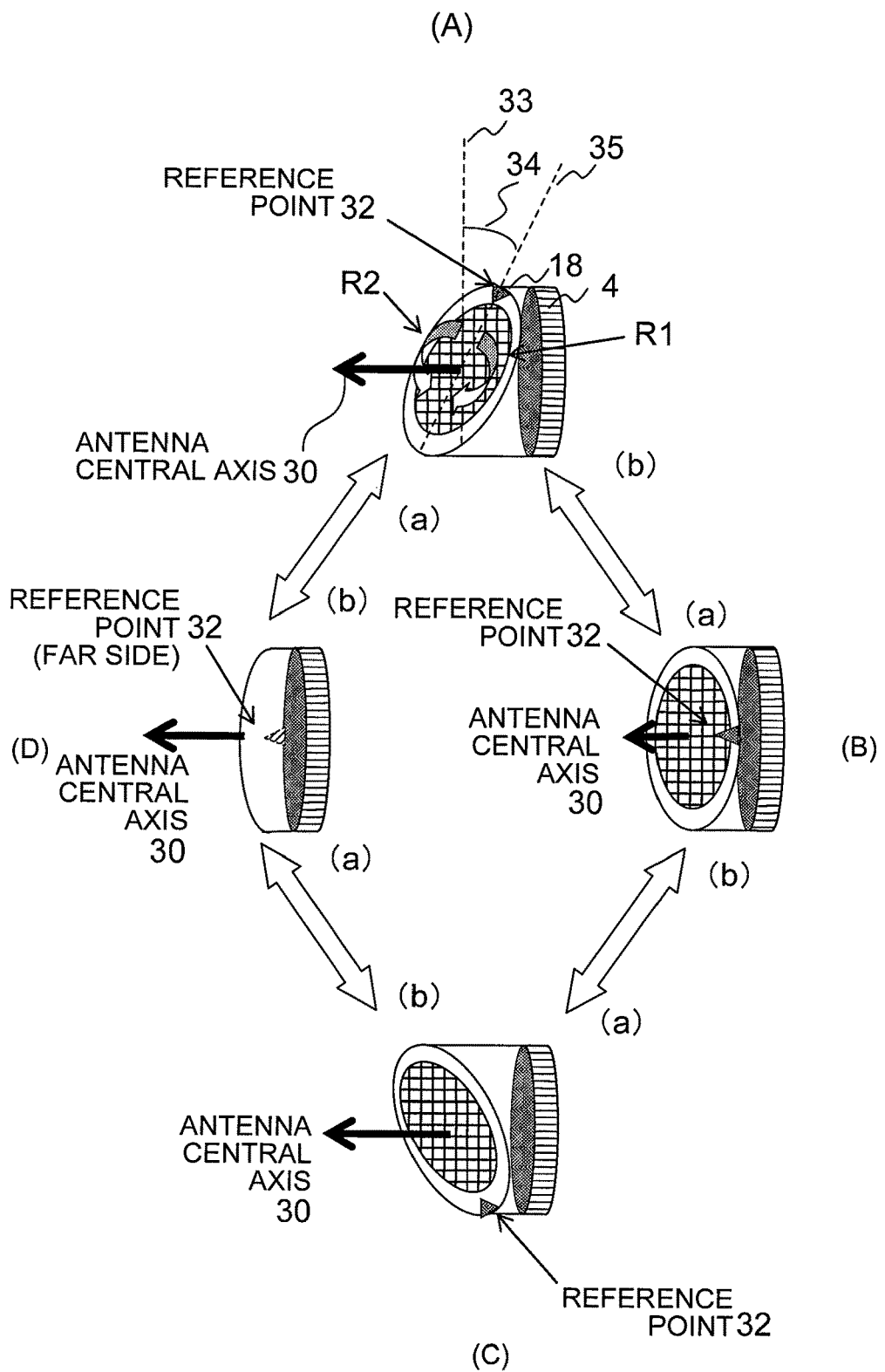
FIGS. 15(A)-(D) are diagrams for illustrating the movement of the aperture surface according to the fifth embodiment of the present invention.

FIG. 15 are diagrams for illustrating the configuration and operation of the aperture surface 18, and how the coverage of the radar device according to this embodiment is expanded.

As described above, the aperture surface 18 is slanted at the tilt angle 34 with respect to the antenna central axis 30, unlike the aperture surface 1 of the first embodiment to the fourth embodiment.

FIG. 15 are diagrams of the aperture surface 18 viewed from the same direction when the aperture surface 18 is rotated by 90° at a time to arrive at four cases, (A) to (D). FIG. 15(A) is a case where the reference point 32 of the aperture surface 18 is in a 0° direction. FIG. 15(B) is a case where the reference point 32 of the aperture surface 18 is in a 90° direction. FIG. 15(C) is a case where the reference point 32 of the aperture surface 18 is in a 180° direction, and FIG. 15(D) is a case where the reference point 32 of the aperture surface 18 is in a 270° direction (or −90° direction). In FIG. 15, R1 indicates the clockwise direction, R2 indicates the counter-clockwise direction, (a) indicates a clockwise (the direction R1) rotation by 90°, and (b) indicates a counter-clockwise (the direction R2) rotation by 90°. An axis parallel to the aperture flat surface 18a of the aperture surface 18 is denoted by a symbol 35. An angle between the axis 33 and the axis 35 is therefore the tilt angle 34.

By mechanically rotating the aperture surface 18 about the antenna central axis 30 in this manner, the direction in which the aperture surface 18 is oriented can be changed successively by an amount determined by the rotation angle.

Figure 16:
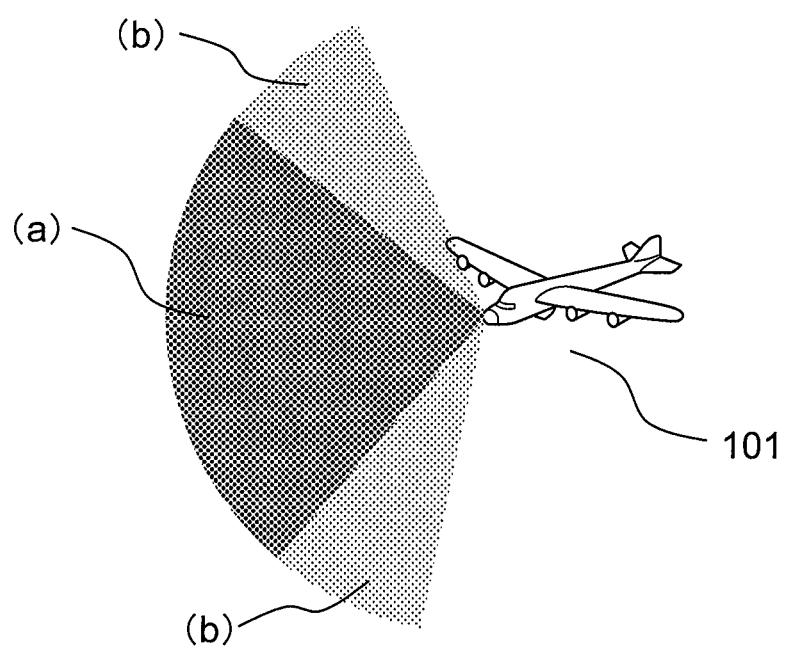
FIG. 16 is a diagram for illustrating how the coverage is expanded by controlling the aperture surface according to the fifth embodiment of the present invention.

FIG. 16 is a schematic diagram for illustrating the coverage of the radar device 100 installed in the radar's own machine 101. Coverage (a) is coverage observed when the radar operates in electronic scanning alone, and coverage (b) is coverage observed when the aperture surface 18 is rotated through mechanical driving (driving by the motor 5). In other words, (a) in FIG. 16 is coverage observed when only electronic scanning is used and mechanical driving is not used in combination, and (b) in FIG. 16 is coverage observed when electronic scanning and mechanical driving are used in combination.

The combined use of the mechanical rotation of the aperture surface 18 by the motor 5 and electronic scanning in the beam orientation direction by the phase shifters 3 thus expands the coverage in a conical pattern from when electronic scanning is used alone.

FIG. 17(a) is a left-side view of the aperture surface 18 in the case of FIG. 15A where the reference point of the aperture surface 18 is in the 0° direction, and FIG. 17(b) is a top view of the aperture surface 18 in this case.

Figure 17:
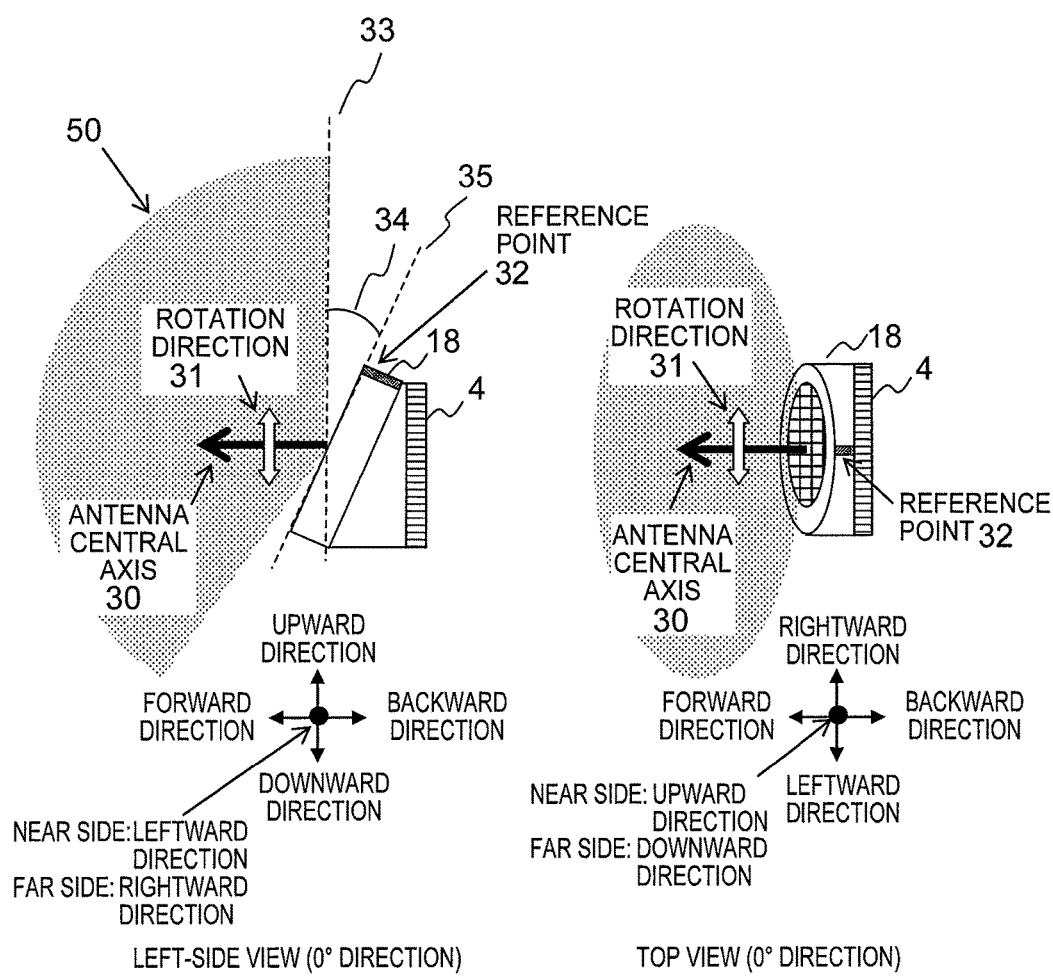
FIG. 17 is a diagram (in a 0° direction) for illustrating how the coverage is expanded by controlling the aperture surface according to the fifth embodiment of the present invention.

In FIG. 17 where the reference point is in the 0° direction, coverage 50 of the aperture surface 18 is expanded in an upward direction by an amount expressed in Expression (3), at maximum.

This is because a beam can be run by electronic scanning with the aperture surface 18 offset by the tilt angle 34 in the upward direction. In the case where the tilt angle (η) is 30° and the maximum coverage in electronic scanning (Ψmax) is 60°, for example, the original coverage, which is 60° in the upward direction, expands to 90° coverage as illustrated in FIG. 17.

FIG. 18(a) is a right-side view of the aperture surface 18 in the case of FIG. 15(b) where the reference point of the aperture surface 18 is in the 90° direction, and FIG. 18(b) is a top view of the aperture surface 18 in this case.

When the reference point is in the 90° direction in FIG. 15(b) the coverage 50 of the aperture surface 18 is expanded in a rightward direction by an amount expressed in Expression (3), at maximum. This is because a beam can be run by electronic scanning with the aperture surface 18 offset by the tilt angle 34 in the rightward direction, as in the upward direction.

Figure 18:
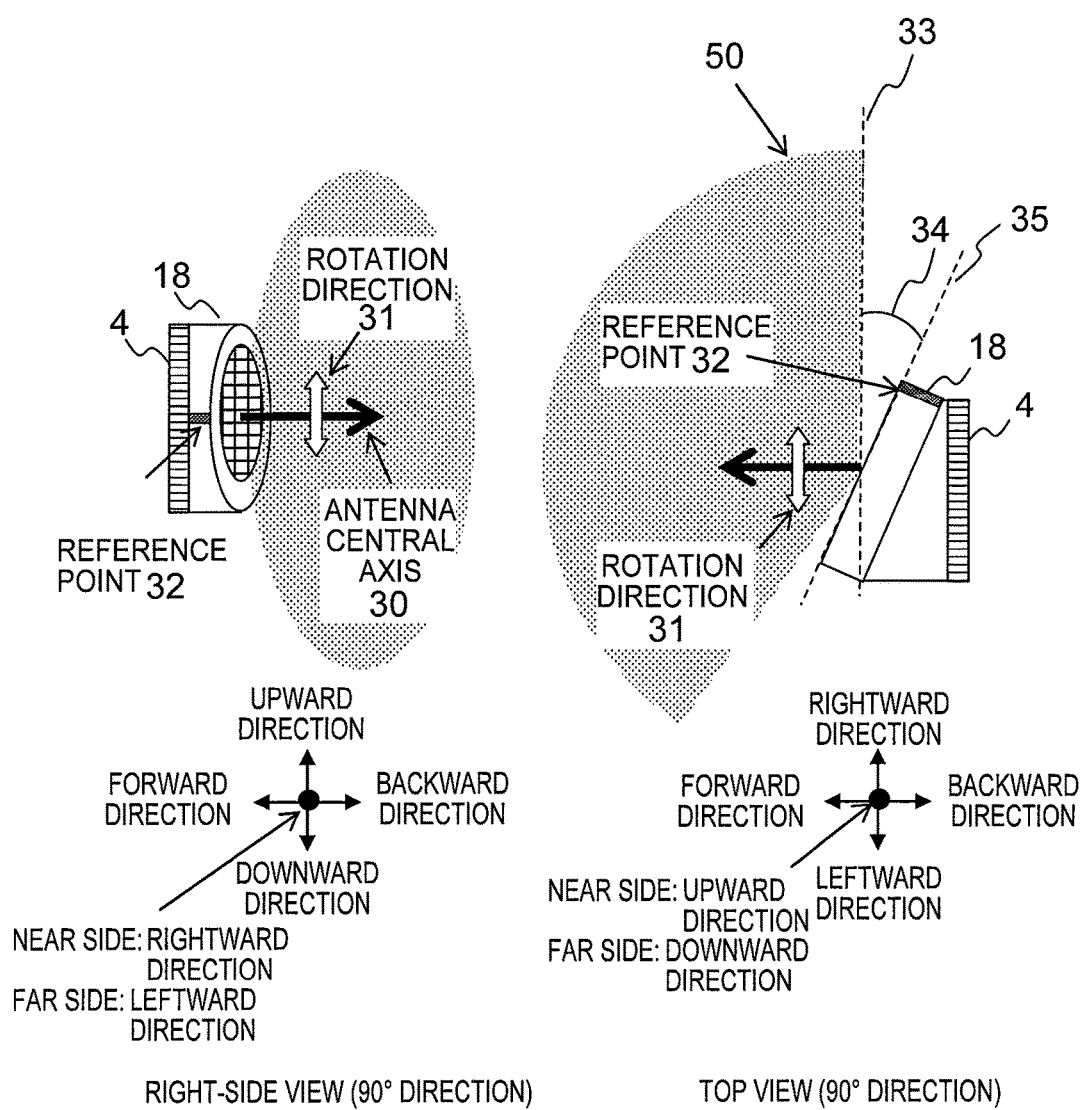
FIG. 18 is a diagram (in a 90° direction) for illustrating how the coverage is expanded by controlling the aperture surface according to the fifth embodiment of the present invention.

In the case where the tilt angle (η) 30° and the maximum coverage in electronic scanning (Ψmax) is 60°, for example, the original coverage, which is 60° in the rightward direction, expands to 90° coverage as illustrated in FIG. 18.

FIG. 19(a) is a left-side view of the aperture surface 18 in the case of FIG. 15(D) where the reference point of the aperture surface 18 is in the 270° direction, and FIG. 19(b) is a top view of the aperture surface 18 in this case.

When the reference point is in the 270° direction in FIG. 15(D), the coverage 50 of the aperture surface 18 is expanded in a leftward direction by an amount expressed in Expression (3), at maximum. This is because a beam can be run by electronic scanning with the aperture surface 18 offset by the tilt angle 34 in the leftward direction, as in the rightward direction.

Figure 19:
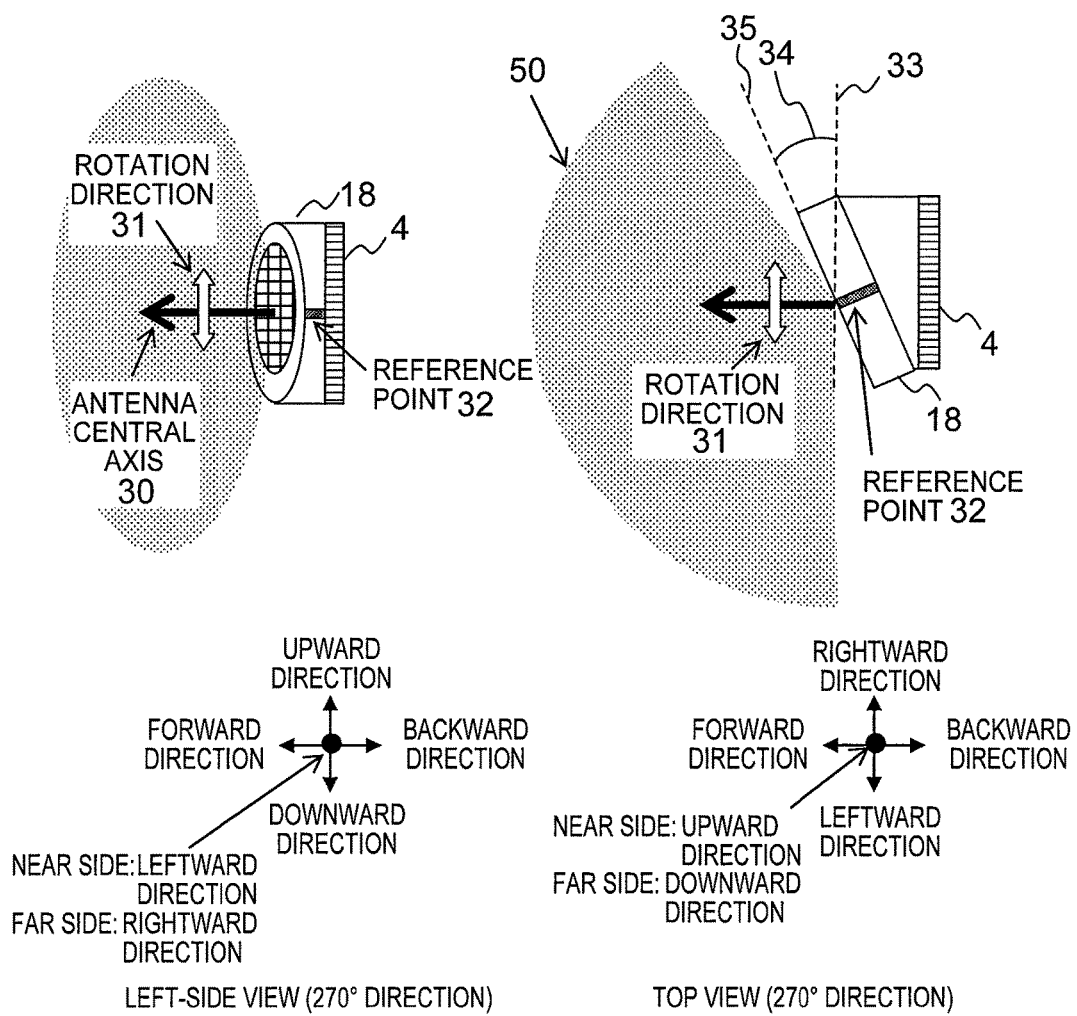
FIG. 19 is a diagram (in a 270° direction) for illustrating how the coverage is expanded by controlling the aperture surface according to the fifth embodiment of the present invention.

In the case where the tilt angle (η) is 30° and the maximum coverage in electronic scanning (Ψmax) is 60°, for example, the original coverage, which is 60° in the leftward direction, expands to 90° coverage as illustrated in FIG. 19.

FIG. 20(a) is a left-side view of the aperture surface 18 in the case of FIG. 15(C) where the reference point of the aperture surface 18 is in the 180° direction, and FIG. 20(b) is a top view of the aperture surface 18 in this case.

Figure 20:
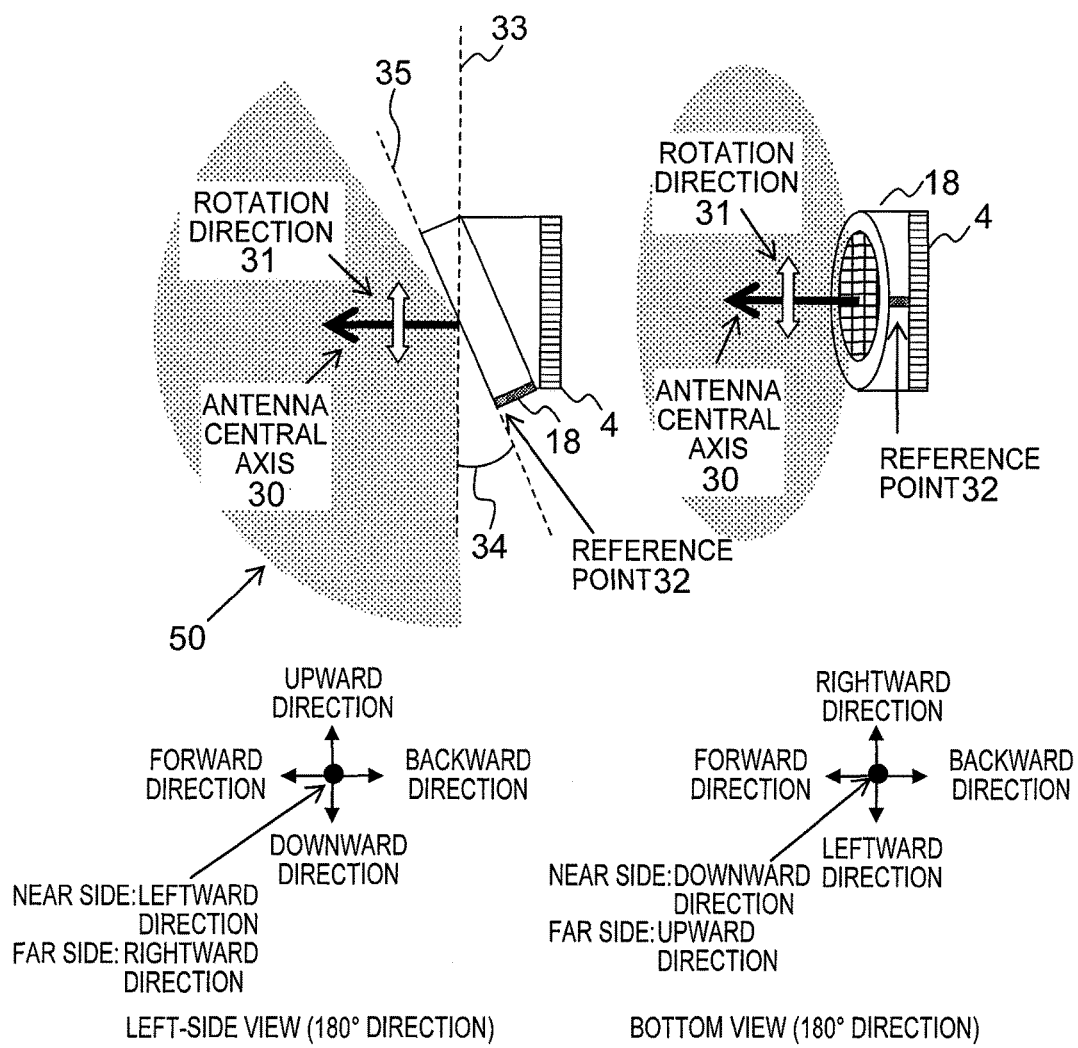
FIG. 20 is a diagram (in a 180° direction) for illustrating how the coverage is expanded by controlling the aperture surface according to the fifth embodiment of the present invention.

In FIG. 20 where the reference point is in the 180° direction, the coverage 50 of the aperture surface 18 is expanded in a downward direction by an amount expressed in Expression (3), at maximum. This is because a beam can be run by tronic scanning with the aperture surface 18 offset by the tilt angle in the downward direction, as in the upward direction.

In the case where the tilt angle (η) is 30° and the maximum coverage in electronic scanning (Ψmax) is 60°, for example, the original coverage, which is 60° in the downward direction, expands to 90° coverage as illustrated in FIG. 20.

The coverage thus expands in total by a cone angle that is twice larger than θmax expressed by Expression (3) in the upward direction, the rightward direction, the leftward direction, and the downward direction as illustrated in FIG. 17 to FIG. 20, and in all the other directions. In the example given above, the coverage that has a cone angle of 120° when electronic scanning is used alone expands to a cone angle of 180°.

Figure 21:
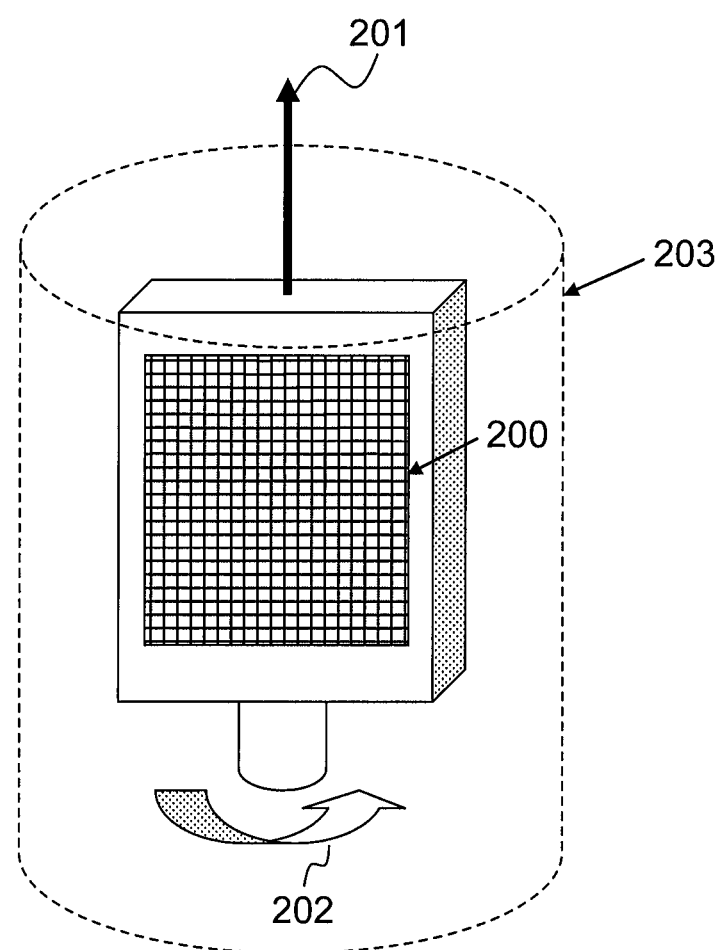
FIG. 21 is a diagram for illustrating a radar device of the related art.

FIG. 21 is a diagram of a rotary radar device of the related art which is described in, for example, Patent Literature 4.

In a rotary antenna of the related art which is illustrated in FIG. 21, an aperture surface 200 rotates about an antenna rotation axis 201 in a rotation direction (AZ direction) 202. The coverage of this antenna can be expanded in the rotation direction (AZ direction) 202, but cannot be expanded in other directions than the rotation direction 202. The antenna in which the aperture surface 200 rotates in the rotation direction 202 also needs a space 203 indicated by the dotted line which is large enough for the aperture surface 18 to rotate.

In contrast, the radar device according to the present invention that has been described with reference to FIG. 16 to FIG. 20 does not need to secure an installation space to rotate the aperture surface 18 because the aperture surface 18 simply rotates about a rotation axis and just moves as though pushed from behind.

When the aperture surface 18 is circular, in particular, the installation space is not large in size by any measure. Using electronic scanning and mechanical driving in combination as the aperture surface 18 does thus expands the coverage of an aperture surface in every direction in which the aperture surface can be driven mechanically.

In addition, in the radar device according to the present invention that has been described with reference to FIG. 16 to FIG. 20, the coverage spreads sideways and the synthetic aperture time is accordingly shortened when the synthetic aperture radar (SAR) is put into operation because the aperture surface 18 rotates about a rotation axis unlike the rotary antenna of the related art. Even higher resolution can be attained as a result. Moreover, the physical sideway orientation of the aperture surface enables the radar device to have a plurality of apertures equivalently in a direction perpendicular to the traveling direction by dividing the aperture, and operating the radar in relation to the movement of the own machine 101 allows the use of spatio-temporal filtering such as space-time adaptive processing (STAP) or displaced phase center antenna (DPCA), which enables the radar device to detect a slow moving target that competes with main beam cluttering.

The radar device according to this embodiment is thus capable of changing the antenna coverage of the radar device in an arbitrary manner with ease and is accordingly capable of detecting a target with precision by disposing the aperture surface 18 at a tilt angle and through the combined use of electronic scanning by the phase shifters 3 and the mechanical driving of the aperture surface 18 by the motor 5.

The radar device is further capable of detecting a slow moving target that competes with main beam cluttering because spatio-temporal filtering can be used in this embodiment as described above.

Sixth Embodiment

A sixth embodiment according to the present invention is described below with reference to the drawings.

Figure 22:
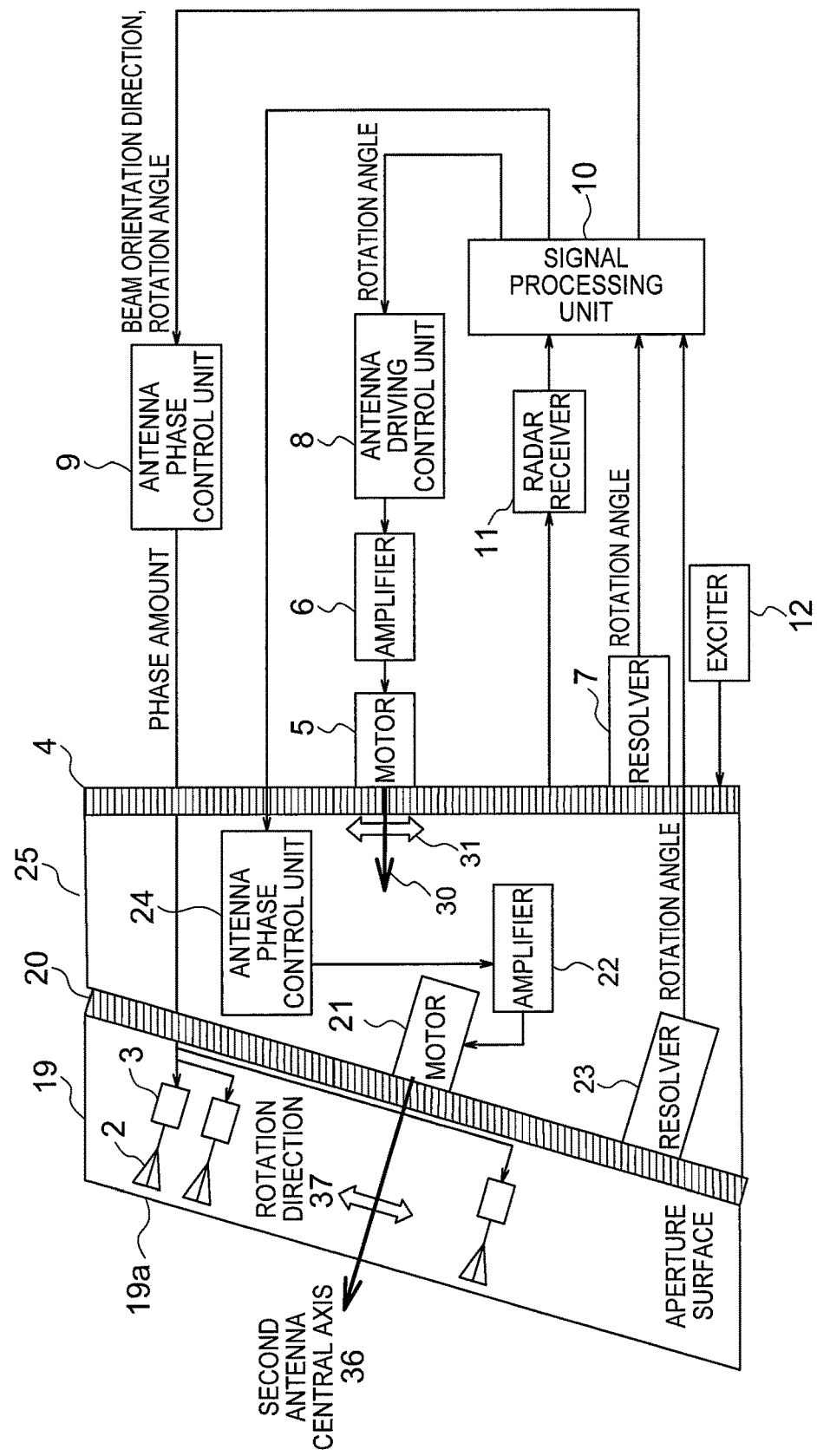
FIG. 22 is a diagram for illustrating a radar device according to a sixth embodiment of the present invention in which an aperture surface is controlled.

FIG. 22 is a diagram for illustrating the configuration of a radar device according to the sixth embodiment. The radar device according to this embodiment includes, in addition to the components of the fifth embodiment, an aperture surface 19, a second gear 20, a second motor 21, a second amplifier 22, a second resolver 23, a second antenna driving control unit 24, and a relay housing 25. The second motor 21, the second amplifier 22, the second resolver 23, and the second antenna driving control unit 24 are provided inside the relay housing 25.

A comparison between FIG. 14 and FIG. 22 shows that, this embodiment, the aperture surface 19, which is an aperture surface portion having an aperture flat surface 19a, and the relay housing 25, which is a support portion configured to support the aperture surface 19, are provided in place of the aperture surface 18 of the fifth embodiment as illustrated in FIG. 22. It can therefore be said that an "aperture surface" in this embodiment is made up of the aperture surface 19 and the relay housing 25.

The signal processing unit 10 in this embodiment transmits an arbitrary rotation angle to the antenna driving control unit 24 to rotate the aperture surface 19 by the arbitrary angle via the amplifier 22 and the motor 21. The resolver 23 detects the rotation angle of the aperture surface 19, and transmits the detected rotation angle to the signal processing unit 10.

In this embodiment, the relay housing 25 is rotated about the first antenna central axis 30 by the motor 5 and the first gear 4, and the aperture surface 19 is also rotated about a second antenna central axis 36 by the motor 21 and the second gear 20. In FIG. 22, the rotation direction of the first antenna central axis 30 is denoted by a symbol 31 and the rotation direction of the second antenna central axis 36 is denoted by a symbol 37.

The radar device according to this embodiment, where the aperture surface 19 is rotated biaxially, thus has a structure in which a rotation angle that cannot be achieved with the first gear 4 described in the fifth embodiment is supplemented by the second gear 20.

The rest of the components that have the same functions as the components described in the first embodiment to the fourth embodiment are denoted by the same reference numbers, and descriptions thereof are omitted.

This embodiment has a feature in that the aperture surface 19 is disposed at the constant tilt angle 34 with respect to the first antenna central axis 30 in the first gear 4, and has a biaxial rotation driving system made up of the first gear 4 and the second gear 20.

A comparison between FIG. 14 of the fifth embodiment and FIG. 22 of this embodiment shows that the relay housing 25 of FIG. 22 has the same configuration as that of the aperture surface 18 of FIG. 14 if internal components are ignored. With the relay housing 25 being the same in configuration and operation as the aperture surface 18 of FIG. 14, detailed descriptions on the configuration and operation of the relay housing 25 are omitted here.

The relay housing 25 is disposed at the tilt angle 34 as is understood from the description given above. The aperture surface 19 provided in the relay housing 25 is accordingly disposed at the tilt angle 34 as well. The aperture surface 19 is therefore capable of expanding the antenna coverage by an amount expressed in Expression (3) by rotating the first gear 4 as in the fifth embodiment. The operation of expanding the coverage is as illustrated in FIG. 16 to FIG. 20.

In this embodiment, even if the gear 20 is made stationary to stop rotating the aperture surface 19, the aperture position of the aperture surface 19 is changed by rotating the relay housing 25 alone, which changes the antenna coverage and consequently provides the same effects as the ones in the fifth embodiment.

In addition, the aperture surface 19 can be rotated by an arbitrary rotation angle in this embodiment by putting the gear 20 into operation through the operation of the motor 21, the amplifier 22, and the antenna driving control unit 24 as described above.

A comparison of the aperture surface 19 of this embodiment to the aperture surface 1 of the first embodiment to the fourth embodiment mentioned above, and a seventh embodiment and an eight embodiment of the present invention shows that the aperture surface 19 has the same configuration as that of the aperture surface 1 of the first embodiment to the fourth embodiment, the seventh embodiment, and the eight embodiment if the tilt angle 34 is ignored. In other words, the aperture surface 19 is equivalent to the aperture surface 1 of the first embodiment to the fourth embodiment, in the case where the aperture surface 1 is disposed at the tilt angle 34. The aperture surface 19 is therefore capable of the same operation as that of the aperture surface 1 of the first embodiment to the fourth embodiment. Specifically, a target can be detected with precision by rotating the aperture surface 19 about the second antenna central axis 36 to change the polarization plane, and by performing control in which the arrival direction of an unnecessary wave is set to a sidelobe nullifying direction, to thereby reduce the influence of the unnecessary wave.

This embodiment accordingly presents the effects of the first embodiment to the fourth embodiment, the seventh embodiment, and the eighth embodiment in addition to the effects of the fifth embodiment.

The radar device according to this embodiment can thus present the same effects as those of the radar devices described in the first embodiment to the fifth embodiment, the seventh embodiment, and the eighth embodiment.

In this embodiment, the resolver 23 measures the angle and sends the result of the measurement to the signal processing unit 10 in order to detect the correct position of the gear 20.

The signal processing unit 10 sets in the antenna driving control unit 8 a rotation angle that corresponds to coverage to be expanded mainly, and sets in the antenna driving control unit 24 a rotation angle necessary for the aperture surface 19 to attain the effects of the first embodiment to the fourth embodiment. The signal processing unit 10 sets a beam orientation direction in the antenna phase control unit 9 by taking into account the rotation angles set in the antenna driving control unit 8 and the antenna driving control unit 24. The chance of accomplishing optimum control is higher in this embodiment, where two axes are used to attain two effects: coverage expansion and optimum aperture surface control, than in the fifth embodiment. The relay housing 25 is a structure for holding the gear 4 and the gear 20.

The gear 4 and the gear 20 can be rotated independently of each other by connecting the aperture surface 19 to the signal processing unit 10 and other components with wiring that has an extra length long enough to enable the gear 20 to rotate the aperture surface 19. There is no need for a rotary joint to connect the two axes, and hence the radar device can be made small in size and a loss by a rotary joint can be eliminated.

Figure 25:
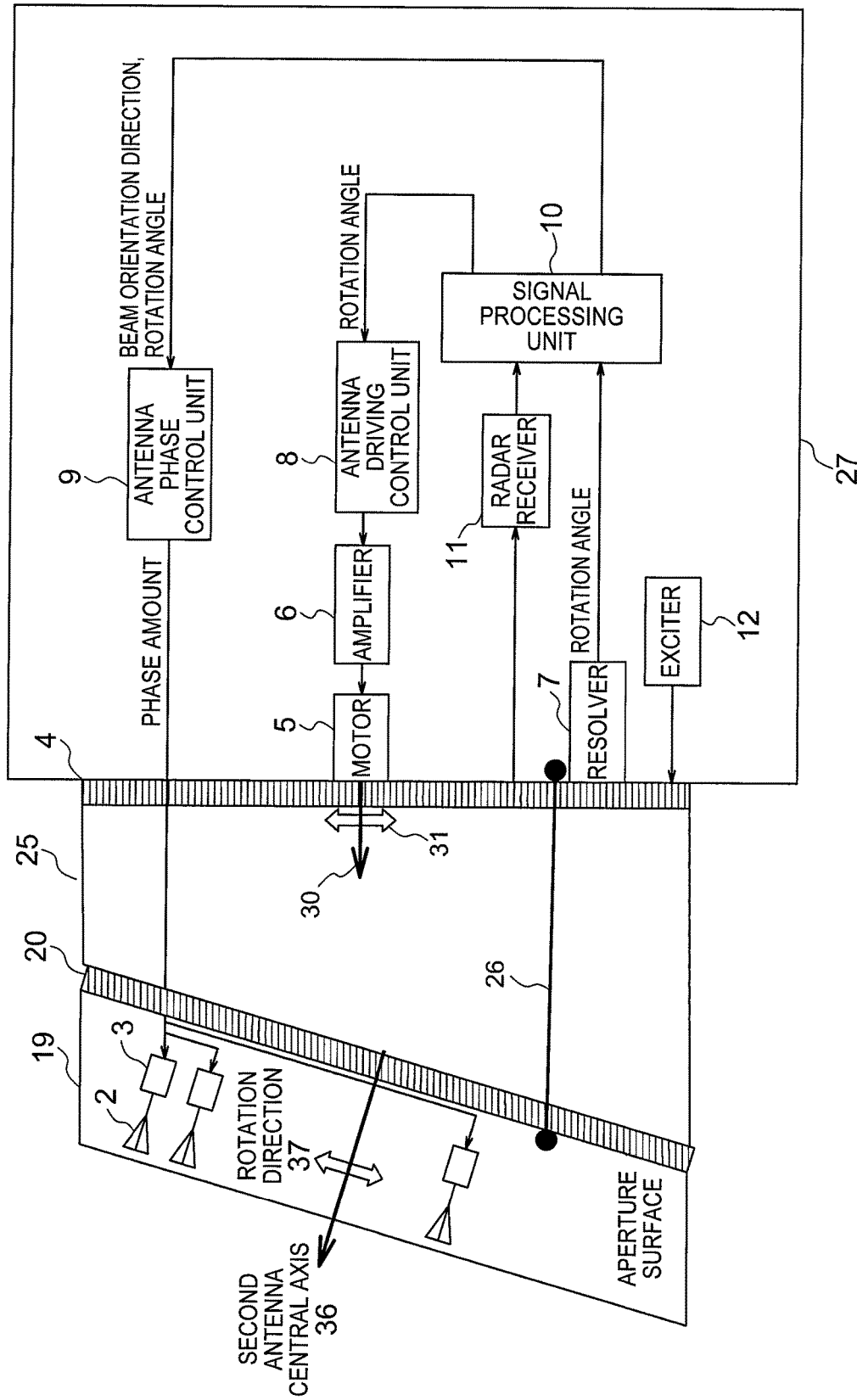
FIG. 25 is a diagram for illustrating a modification example of a radar device according to the sixth embodiment of the present invention in which the aperture surface is controlled.

Actual antenna driving in the sixth embodiment may use, other than the mode illustrated in FIG. 22, an adjustable joint, a Stewart platform, or the like (hereinafter referred collectively to as "adjustable joint 26 or the like") as illustrated in FIG. 25. The motor 21, the amplifier 22, the resolver 23, and the antenna driving control unit 24 in FIG. 22 can be omitted by using the adjustable joint 26 or the like, with the result that size reduction and weight reduction are accomplished. A stationary structure 27 illustrated in FIG. 25 is a structure that serves as a reference for the adjustable joint 26 or the like. The stationary structure 27 houses the motor 5, the amplifier 6, the resolver 7, the antenna driving control unit 8, the antenna phase control unit 9, the signal processing unit 10, the radar receiver 11, and the exciter 12.

When the aperture surface 19 is driven by the mode illustrated in FIG. 25, independently driving the aperture surface 19 is inexecutable. This is different from the case shown in FIG. 22. In FIG. 25, the driving of the aperture surface 19 is interlocked with the movement of the relay housing 25. The polarization of the aperture surface 19, which can be changed arbitrarily in the configuration of FIG. 22, cannot be changed freely in the configuration of FIG. 25, and the antenna driving also contributes to the aperture surface 19 being fixed to the same polarization all the time. Specifically, the aperture surface 19 and the relay housing 25 are rotated in an interlocking manner with a rotation direction 31 around the first antenna central axis 30 and a rotation direction 37 around the second antenna central axis 36 set in opposite directions in the configuration of FIG. 25. This keeps the reference point of FIG. 3 always at the same position, thereby preventing the polarization plane from changing and fixing the aperture surface 19 to the same polarization all the time. While the configuration of FIG. 25 consequently has a lesser degree of freedom in control for obtaining the effects of the first embodiment to the fifth embodiment, the seventh embodiment, and the eighth embodiment, the aperture surface 19 is still physically driven in the configuration of FIG. 25. The effects of the first embodiment or the second embodiment can be expected despite the fixed polarization if an antenna beam that orients the cluttering direction or the arrival direction of a jamming signal or the like toward a nullifying direction can be formed by changing the physical position of the aperture surface 19. The effects of the third embodiment can also be expected because at least the angle between an arriving electromagnetic wave and the antenna aperture surface can be changed out of the conditions under which an arriving electromagnetic wave becomes a Bragg lobe signal ((1) the frequency of the arriving electromagnetic wave, (2) the angle between the arriving electromagnetic wave and the antenna aperture surface, and (3) the interval between antenna elements). The effects of the fifth embodiment, the seventh embodiment, and the eighth embodiment can further be expected because driving the aperture surface 19 enables the radar device to expand coverage, to use spatio-temporal filtering, to perform optimum control of the antenna aperture surface 19 when dealing with a plurality of targets, and to operate so as to avoid putting its own aperture surface right across from a target. In short, this embodiment can present the effects of the first embodiment to the fifth embodiment, the seventh embodiment, and the eighth embodiment. In addition, the radar device of this embodiment where the aperture surface 19 is kept to the same polarization all the time can maintain one type of polarization with ease in communication and other uses that require fixed polarization. The radar device of this embodiment also does not need to use a rotary joint, which enables minimization of causes of failure such as mechanical stress and a leakage of cooling liquid due to a contact point of a rotary joint.

Seventh Embodiment

A seventh embodiment according to the present invention is described below with reference to the drawings.

The configuration of the radar device according to this embodiment is the same as that of FIG. 1 and therefore FIG. 1 is referred to herein. That is, as illustrated in FIG. 1, the radar device according to this embodiment includes the aperture surface 1, the element antennas 2, the phase shifters 3, the gear 4, the motor 5, the amplifier 6, the resolver 7, the antenna driving control unit 8, the antenna phase control unit 9, the signal processing unit 10, the radar receiver 11, the exciter 12, and the pattern calculating unit 13. The configuration and operation of those components are the same as those in the first embodiment. The rest of the components that have the same functions as the components described in the first embodiment are denoted by the same reference numbers, and descriptions thereof are omitted.

Figure 26:
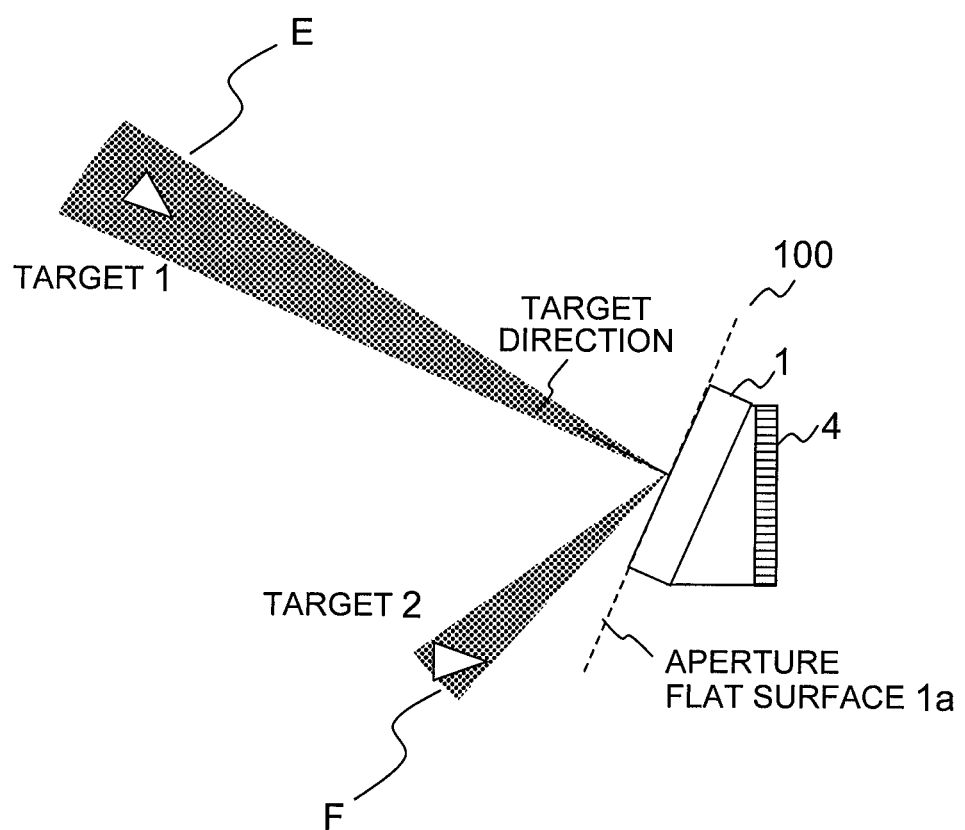
FIG. 26 is a diagram for illustrating the switching of a beam for one target to a beam for another target according to a seventh embodiment of the present invention.

In the case where the radar device 100 is continuing to observe two or more (a plurality of) targets as illustrated in FIG. 26, the radar needs to perform a trial run on each target in a very short time. Driving the antenna aperture surface mechanically in a very short time is difficult, and a beam needs to be run by electronic scanning with mechanical driving set to stationary. The signal processing unit 10 is capable of measuring for each target a distance to the target and the detection level of the target. From the information about the distance and the detection level, the signal processing unit 10 sets, for the long distance target and the short distance target each, an optimum rotation angle at which a necessary sensitivity can be obtained, and forms a beam to detect the target.

Specifically, a direction orthogonal to an aperture flat surface high in sensitivity is oriented toward a target (indicated by the symbol E) in the case of a long distance target such as a target 1 of FIG. 26, or a target that has a small radar reflection sectional area. In other words, a rotation angle that makes an angle between the aperture flat surface of the aperture surface 1 and the target direction close to 90° is calculated to control the antenna driving control unit 8, which improves sensitivity and accordingly facilitates the detection of the target.

Meanwhile, in the case of a short distance target such as a target 2 of FIG. 26, or a target that has a large radar reflection sectional area, a wide an direction low in sensitivity is oriented toward the target (indicated by the symbol F).

The aperture surface 1 can be controlled efficiently on the whole in this manner. It is effective to compare the received power of a signal from one target and the received power of a signal from another target in the signal processing unit 10 with the use of Expression (4), and to perform control for setting an optimum rotation angle based on the distance to the target, the reflection sectional area of the target, and an antenna gain in the direction of the target which is obtained from the pattern calculating unit 13.

$$S \propto \frac{Gt \cdot Gr \cdot \sigma}{R^4} \quad \text{[Expression 4]}$$

where

S: the received power of a signal from a target,

R: a distance to the radar device's own machine,

σ: the radar reflection sectional area of the target,

Gr: an antenna reception Gain in the direction of the target,

Gt: an antenna transmission gain in the direction of the target.

The radar device according to this embodiment is thus capable of observing a plurality of targets with efficiency by orienting the aperture surface toward an optimum direction.

Eighth Embodiment

An eighth embodiment according to the present invention is described below with reference to the drawings.

The configuration of the radar device according to this embodiment is the same as that of FIG. 1 and therefore FIG. 1 is referred to herein. That is, as illustrated in FIG. 1, the radar device according to this embodiment includes the aperture surface 1, the element antennas 2, the phase shifters 3, the gear 4, the motor 5, the amplifier e, the resolver 7, the antenna driving control unit 8, the antenna phase control unit 9, the signal processing unit 10, the radar receiver 11, the exciter 12, and the pattern calculating unit 13. The configuration and operation of those components are the same as those in the first embodiment. The rest of the components that have the same functions as the components described in the first embodiment are denoted by the same reference numbers, and descriptions thereof are omitted.

Figure 27A:
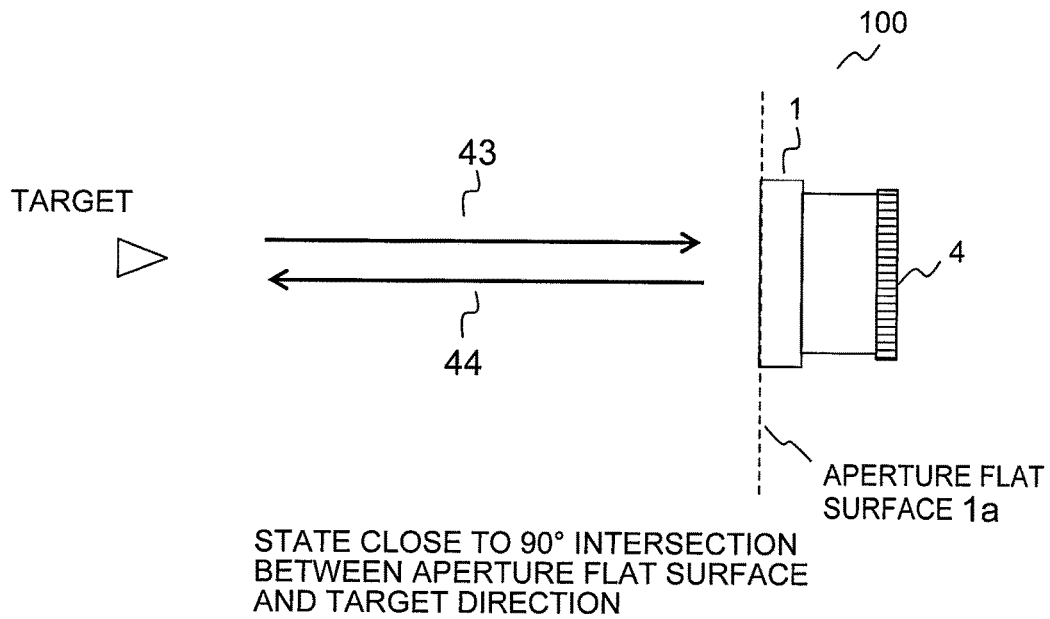
FIGS. 27A and 27B are diagrams for illustrating a reduction in the radar reflection sectional area of a radar device according to an eighth embodiment of the present invention itself.
Figure 27B:
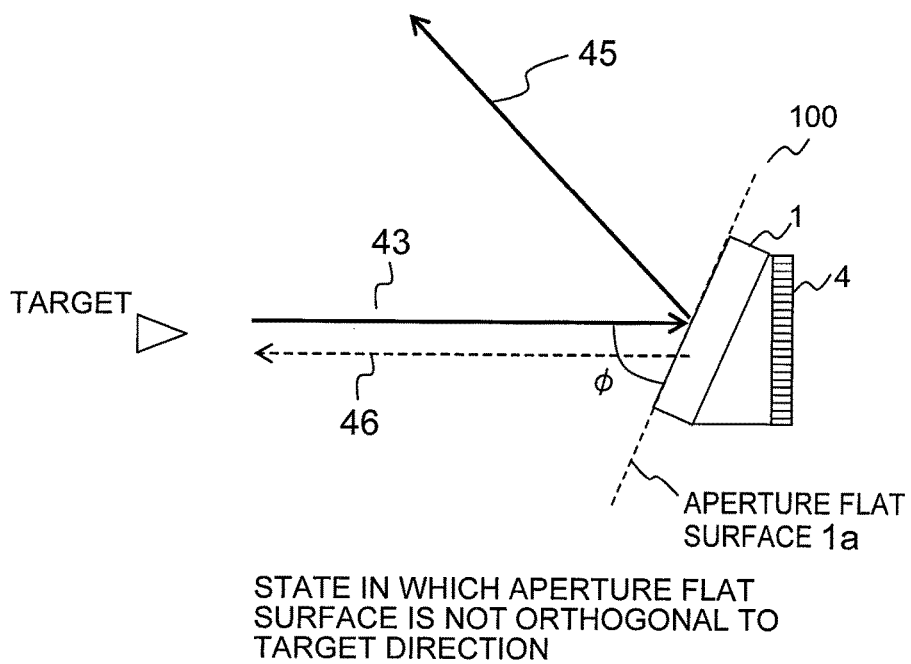

In the case where a target is in a direction that makes an angle between the aperture flat surface and the target direction close to 90° (i.e., in the case where the target is in a normal direction of the aperture flat surface) as illustrated in FIG. 27A, an electromagnetic wave 43 arriving from the target turns into a reflected wave 44, which is reflected toward the target under a condition close to total reflection. This creates a situation in which the chances are high that the radar device 100 itself or the own machine 101 (see FIG. 16) in which the radar device 100 is installed is detected by the target. The signal processing unit 10 in this embodiment may determine whether or not a detected target is at a position similar to the target position in FIG. 27A and, when the condition described above is fulfilled, give the antenna driving control unit 8 an instruction specifying a rotation angle that does not put the aperture surface 1 right across from the target as illustrated in FIG. 27B. The antenna driving control unit 8 drives the aperture surface 1 as instructed, thereby reducing the power of a portion of the electromagnetic wave 43 arriving from the target that is reflected in the direction of the target. Specifically, when the electromagnetic wave 43 arriving from the target is reflected by the aperture flat surface 1a, most of the reflected wave is turned into a reflected wave 45, which travels in a direction different from the target direction as illustrated in FIG. 27B, to thereby reduce a reflected wave 46, which is reflected toward the target, and reduce the power of the reflected wave 46 accordingly. When an angle between the direction of the electromagnetic wave 43 arriving from the target and the aperture flat surface 1a of the aperture surface 1 is given as φ as illustrated in FIG. 27B, the power reflected toward the target decreases as the angle φ becomes smaller. The signal processing unit 10 therefore sets a rotation angle by taking into account coverage in which the angle φ is small and the radar device 100 itself can detect the target.

The radar device according to this embodiment is thus capable of reducing power that is emitted from a target and that is reflected by the aperture surface 1 in the direction of the target by setting the rotation angle of the aperture surface 1 so that the aperture flat surface of the aperture surface 1 is prevented from being orthogonal to the target direction. This enables the radar device to reduce its radar reflection sectional area.

Example 1

Figure 23:
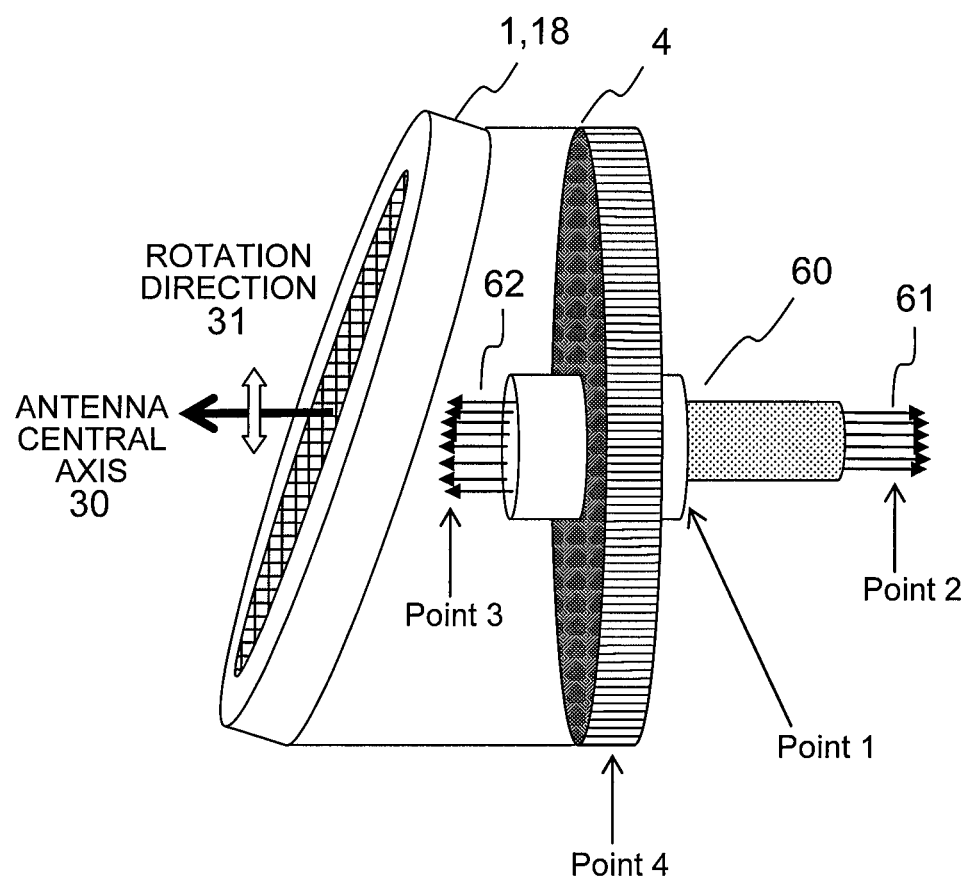
FIG. 23 is a diagram for illustrating Example of carrying out the aperture surface according to the first embodiment to fifth embodiment of the present invention.

FIG. 23 is a structural diagram of a rotation mechanism of the antenna according to the first embodiment to the fifth embodiment. In the rotation mechanism of FIG. 23, the aperture surface 1 or 18 is rotated by a single axis, and a rotary joint 60 is used to connect wiring of the aperture surface 1 or 18 to wiring of the signal processing unit 10 and other components that do not rotate. The pieces of wiring are denoted by symbols 61 and 62 in FIG. 23.

The rotary joint 60 is fit into the gear 4 as illustrated in FIG. 23. The connection between the wiring 61 and the wiring 62 is accomplished by the fitting function of the rotary joint 60 (see Point 1). One wiring 61 in the rotary joint 60 leads to the signal processing unit 10 and other components that do not rotate, and the other wiring 62 leads to the aperture surface 1 or 18 (see Point 2 and Point 3). In this manner, rotation by a single-axis structure is carried out with the use of the rotary joint 60 in the first embodiment to the fifth embodiment (see Point 4).

With this structure in which the antenna aperture surface is driving in the axial direction of the aperture surface in a cylindrical pattern, applying the whole load of the aperture surface to the rotational portion as in the structure of the related art which is illustrated in FIG. 21 is avoided and mechanical load accordingly reduced, thereby preventing failure rate from rising.

Figure 24:
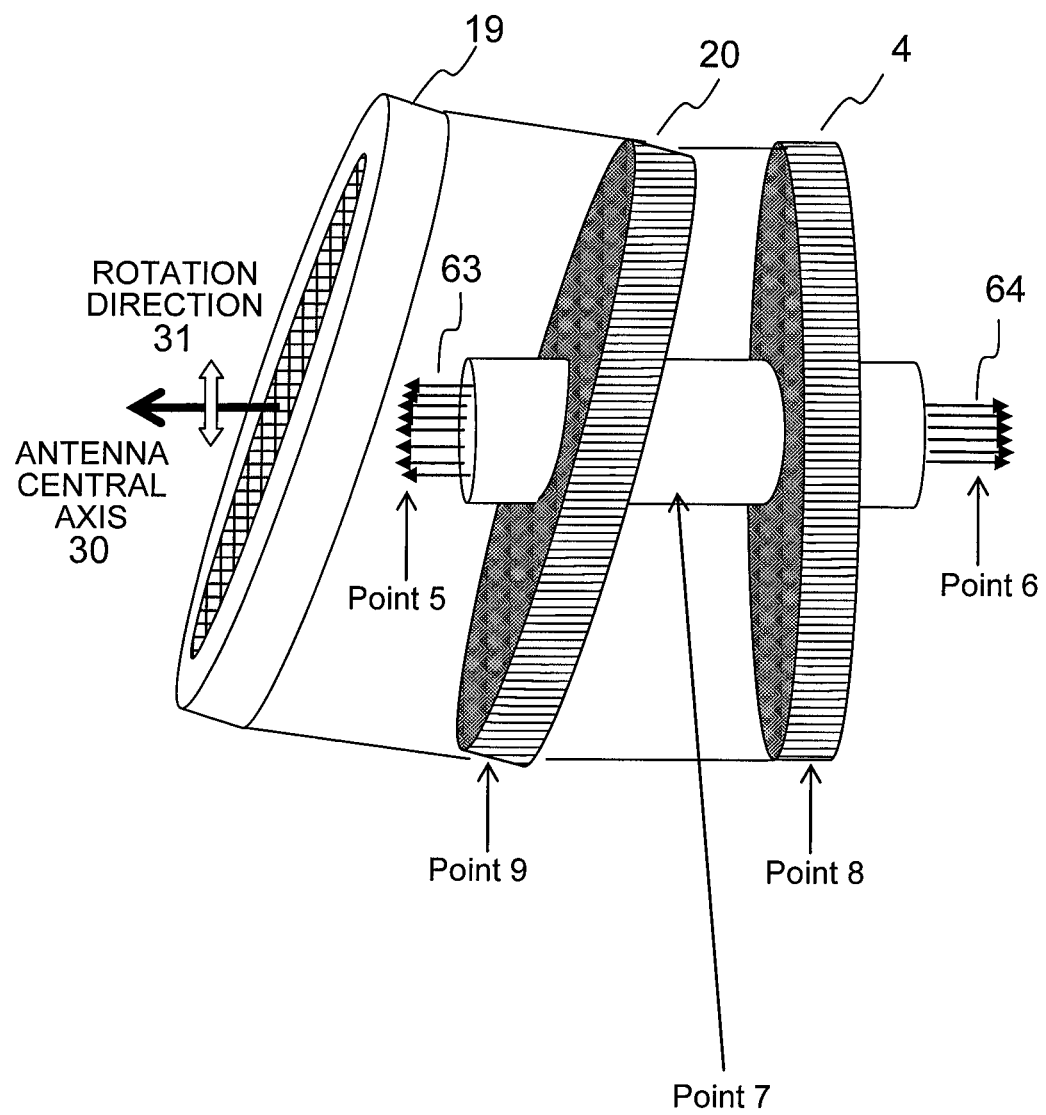
FIG. 24 is a diagram for illustrating Example of carrying out the aperture surface according to the sixth embodiment of the present invention.

FIG. 24 is a structural diagram of a rotation mechanism of the antenna according to the sixth embodiment. In the rotation mechanism of FIG. 24, the aperture surface of the radar is rotated by two axes, and wiring 63 for the aperture surface and wiring 64 for the signal processing unit 10 and other components that do not rotate are made without using a rotary joint (see Point 5 and Point 6). The wiring without a rotary joint is accomplished in FIG. 24 by laying wiring inside the gear 4 and the gear 20 (see Point 7). The coverage of the radar device 100 is expanded mainly by the first antenna central axis 30 of the gear 4 to optimize the rotation angle of the aperture surface 19 as much as possible (see Point 8). The optimization of the rotation angle of the aperture surface 19 is further advanced in the sixth embodiment, where the aperture surface 19 can be rotated about the second antenna central axis 36 of the gear 20 by a rotation angle that cannot be achieved with the gear 4 (see Point 9). This makes the structure of FIG. 24 superior to the structure of FIG. 23 in that mechanical stress, a leakage of cooling liquid, and other problems due to a contact point of a rotary joint can be avoided, which prevents the failure rate from rising. Omitting a rotary joint large in size and heavy in weight also helps to reduce the size and weight of the radar device.

Rotating the aperture surface by a biaxial structure means that a rotation angle that cannot be achieved with the first gear 4 can be supplemented by the second gear, which is the second axis.

The first gear, which is the first axis, can expand the coverage to optimize the rotation angle of the aperture surface as much as possible.

As described above, the radar devices according to the present invention are useful for systems in which cluttering, jamming, and Bragg lobe affect radar performance. The present invention is particularly effective to highly sensitive radars configured to detect a small target from among cluttering. The present invention also enables synthetic aperture radars to obtain image data in arbitrary polarization. The fifth embodiment has a further advantage in that the coverage can be expanded larger than an aperture in electronic scanning where the aperture surface is stationary. In addition, the radar reflection sectional area can be reduced equivalently by driving the aperture surface to control the direction of an electromagnetic wave reflected by the aperture surface.

REFERENCE SIGNS LIST

1 aperture surface, 2 element antenna, 3 phase shifter, 4 gear, 5 motor, 6 amplifier, 7 resolver, 8 antenna driving control unit, 9 antenna phase control unit, 10 signal processing unit, 11 radar receiver, 12 exciter, 13 pattern calculating unit, 14 broadband receiver, 15 reflection direction calculating unit, 16 SAR image display unit, 17 rotation angle setting unit, 18 aperture surface, 19 aperture surface, 20 second gear, 21 second motor, 22 second amplifier, 23 second resolver, 24 second antenna driving control unit, 25 relay housing, 100 radar device.

The invention claimed is:

1. A radar device, comprising:
   an aperture surface provided in a manner that allows the aperture surface to rotate about a central axis that is disposed through a center of an aperture enclosed by the aperture surface, and comprising element antennas and phase shifters, the element antennas being configured to transmit electromagnetic waves as transmission signals and receive, as reception signals, reflected waves that are the electromagnetic waves reflected by a target, the phase shifters being configured to set phases of the transmission signals;
   a signal processor configured to detect the target based on the reception signals received by the element antennas, and determine, when there is an unnecessary electromagnetic wave, which is unnecessary in the detection of the target, a rotation angle of the aperture surface and a beam orientation direction of the transmission signals so that influence of the unnecessary wave is suppressed;
   an antenna phase controller configured to determine phase amounts of the transmission signals based on the rotation angle and the beam orientation direction which are input by the signal processor, and set the determined phase amounts to the respective phase shifters; and
   an antenna driving controller configured to set a rotation angle by which the aperture surface is to be rotated, based on the rotation angle input by the signal processor.

2. The radar device according to claim 1, wherein the unnecessary wave comprises at least one of cluttering, a jamming signal, or Bragg lobe.

3. The radar device according to claim 1,
   wherein the aperture surface comprises an aperture flat surface configured to emit and receive the electromagnetic waves that are transmitted/received by the element antennas, and
   wherein the signal processor is configured to determine the rotation angle of the aperture surface so that the aperture flat surface of the aperture surface is prevented from being orthogonal with a direction of the detected target.

4. The radar device according to claim 1,
   wherein the aperture surface comprises an aperture flat surface configured to emit and receive the electromagnetic waves that are transmitted/received by the element antennas, and
   wherein the aperture flat surface is disposed in a direction perpendicular to the central axis.

5. The radar device according to claim 1,
   wherein the aperture surface comprises an aperture flat surface configured to emit and receive the electromagnetic waves that are transmitted/received by the element antennas, and
   wherein the aperture flat surface is slanted with respect to the central axis.

6. The radar device according to claim 5,
   wherein the aperture surface comprises:
      an aperture surface portion in which the aperture flat surface is provided; and
      a support portion configured to support the aperture surface portion,
   wherein the support portion is configured to rotate about the central axis, and
   wherein the aperture surface portion is configured to rotate about a second central axis, which is set in other directions than a direction of the central axis.

7. The radar device according to claim 1, further comprising a pattern calculator configured to calculate an antenna pattern based on the rotation angle of the aperture surface and the beam orientation direction which are input by the signal processor,
wherein the signal processor is configured to detect the target based on the reception signals received by the element antennas, determine a beam orientation direction of the transmission signals and a rotation angle of the aperture surface, set the rotation angle of the aperture surface in the antenna driving controller, set the rotation angle of the aperture surface and the beam orientation direction of the transmission signals in the antenna phase controller, and calculate a level of cluttering that competes with the target, based on the antenna pattern calculated by the pattern calculator, to thereby determine propriety of the rotation angle of the aperture surface.

8. The radar device according to claim 1, further comprising:
a broadband receiver configured to receive a jamming signal and detect a received power and arrival direction of the jamming signal; and
a pattern calculator configured to calculate an antenna pattern based on the rotation angle of the aperture surface and the beam orientation direction which are set by the signal processor, and calculate antenna gain in the arrival direction of the jamming signal,
wherein the signal processor is configured to detect the target based on the reception signals received by the element antennas, determine a beam orientation direction of the transmission signals and a rotation angle of the aperture surface, set the rotation angle of the aperture surface in the antenna driving controller, set the rotation angle of the aperture surface and the beam orientation direction of the transmission signals in the antenna phase controller, determine, based on a received power of the jamming signal which is detected by the broadband receiver, whether or not the jamming signal affects the target detection, and determine propriety of the rotation angle of the aperture surface based on the antenna gain in the arrival direction of the jamming signal when it is determined that the jamming signal affects the target detection.

9. The radar device according to claim 1, further comprising:
a broadband receiver configured to receive a jamming signal and detect a received power, arrival direction, and frequency of the jamming signal; and
a reflection direction calculator configured to calculate a reflection direction in which the jamming signal received by the broadband receiver is reflected by the aperture surface, based on the arrival direction and frequency of the jamming signal and arrangement information about how the element antennas are arranged,
wherein the signal processor is configured to detect the target based on the reception signals on which signal processing has been performed by the radar receiver, determine a beam orientation direction of the transmission signals and a rotation angle of the aperture surface, set the rotation angle of the aperture surface in the antenna driving controller, set the rotation angle of the aperture surface and the beam orientation direction of the transmission signals in the antenna phase controller, determine, based on the received power of the jamming signal which is detected by the broadband receiver, whether or not the jamming signal affects the target detection, and determine, when it is determined that the jamming signal affects the target detection, whether the reflection direction calculated by the reflection direction calculator matches with the arrival direction of the jamming signal received by the broadband receiver, thereby determining whether the jamming signal is a Bragg lobe signal and determining propriety of the rotation angle of the aperture surface.

10. The radar device according to claim 1, further comprising:
a rotation angle setter configured to set the rotation angle of the aperture surface based on an external input; and
an SAR image display configured to display image data that is sent from the signal processor,
wherein the signal processor is configured to generate image data by synthetic aperture radar (SAR) processing based on the reception signals on which signal processing has been performed by the radar receiver, detect the target based on the reception signals, set the rotation angle of the aperture surface in the antenna driving controller based on the rotation angle of the aperture surface that is set by the rotation angle setter, determine a beam orientation direction of the transmission signals, and set the rotation angle of the aperture surface and the beam orientation direction of the transmission signals in the antenna phase controller.

11. A radar device, comprising:
an aperture surface provided in a manner that allows the aperture surface to rotate about a central axis that is disposed through a center of an aperture enclosed by the aperture surface, and comprising element antennas and phase shifters, the element antennas being configured to transmit electromagnetic waves as transmission signals and receive, as reception signals, reflected waves that are the electromagnetic waves reflected by a target, the phase shifters being configured to set phases of the transmission signals;
a signal processor configured to detect the target based on the reception signals received by the element antennas, and determine, when there is an unnecessary electromagnetic wave, which is unnecessary in the detection of the target, a rotation angle of the aperture surface and a beam orientation direction of the transmission signals so that influence of the unnecessary wave is suppressed;
an antenna phase controller configured to determine phase amounts of the transmission signals based on the rotation angle and the beam orientation direction which are input by the signal processor, and set the determined phase amounts to the respective phase shifters; and
an antenna driving controller configured to set a rotation angle by which the aperture surface is to be rotated, based on the rotation angle input by the signal processor,
wherein the aperture surface comprises an aperture flat surface configured to emit and receive the electromagnetic waves that are transmitted/received by the element antennas,
wherein the aperture flat surface is slanted with respect to the central axis,
wherein the aperture surface comprises:
an aperture surface portion in which the aperture flat surface is provided; and
a support portion configured to support the aperture surface portion, wherein the support portion is configured to rotate about the central axis, wherein the aperture surface portion is configured to rotate about a second central axis, which is set in other directions than a direction of the central axis, and wherein the support portion and the aperture surface portion are configured to rotate in an interlocking manner, with the support portion rotating in one rotation direction and the aperture surface portion rotating in an opposite rotation direction thereof so that an orientation of a direction perpendicular to the aperture surface is changed while a polarization direction is fixed.

12. A radar device, comprising:

an aperture surface comprising element antennas and phase shifters, the element antennas being configured to transmit electromagnetic waves as transmission signals and receive, as reception signals, reflected waves that are the electromagnetic waves reflected by a target, the phase shifters being configured to set phases of the transmission signals;

an antenna phase controller configured to calculate, based on a beam orientation direction and on a rotation angle of the aperture surface, phase amounts for setting appropriate phases to the phase shifters and for forming a beam of the transmission signals, and set the calculated phase amounts to the phase shifters;

a gear configured to rotate the aperture surface about a central axis that is disposed through a center of an aperture enclosed by the aperture surface;

a motor configured to drive the gear to rotate the aperture surface;

an amplifier configured to drive the motor;

an antenna driving controller configured to set the rotation angle of the aperture surface to the amplifier;

an exciter configured to generate transmission signals to be transmitted from the element antennas;

a radar receiver configured to perform signal processing on the reception signals received by the element antennas;

a signal processor configured to detect the target based on the reception signals on which signal processing has been performed by the radar receiver, determine a beam orientation direction of the transmission signals and a rotation angle of the aperture surface, set the rotation angle of the aperture surface in the antenna driving controller, set the rotation angle of the aperture surface and the beam orientation direction of the transmission signals in the antenna phase controller, and calculate a level of cluttering that competes with the target based on an antenna pattern, to thereby determine propriety of the rotation angle of the aperture surface; and a pattern calculator configured to calculate the antenna pattern based on the rotation angle of the aperture surface and the beam orientation direction which are input by the signal processor.

13. A radar device, comprising:

an aperture surface comprising element antennas and phase shifters, the element antennas being configured to transmit electromagnetic waves as transmission signals and receive, as reception signals, reflected waves that are the electromagnetic waves reflected by a target, the phase shifters being configured to set phases of the transmission signals;

an antenna phase controller configured to calculate, based on a beam orientation direction and on a rotation angle of the aperture surface, phase amounts for setting appropriate phases to the phase shifters and for forming a beam of the transmission signals, and set the calculated phase amounts to the phase shifters;

a gear configured to rotate the aperture surface about a central axis that is disposed through a center of an aperture enclosed by the aperture surface;

a motor configured to drive the gear to rotate the aperture surface;

an amplifier configured to drive the motor;

an antenna driving controller configured to set the rotation angle of the aperture surface to the amplifier;

an exciter configured to generate transmission signals to be transmitted from the element antennas;

a radar receiver configured to perform signal processing on the reception signals received by the element antennas;

a broadband receiver configured to receive a jamming signal and detect a received power and arrival direction of the jamming signal;

a signal processor configured to detect the target based on the reception signals on which signal processing has been performed by the radar receiver, determine a beam orientation direction of the transmission signals and a rotation angle of the aperture surface, set the rotation angle of the aperture surface in the antenna driving controller, set the rotation angle of the aperture surface and the beam orientation direction of the transmission signals in the antenna phase controller, determine, based on the received power of the jamming signal which is detected by the broadband receiver, whether or not the jamming signal affects the target detection, and determine propriety of the rotation angle of the aperture surface based on an antenna gain in the arrival direction of the jamming signal when it is determined that the jamming signal affects the target detection; and a pattern controller configured to calculate antenna pattern based on the rotation angle of the aperture surface and the beam orientation direction which are set by the signal processor, and calculate the antenna gain in the arrival direction of the jamming signal.

14. A radar device, comprising:

an aperture surface comprising element antennas and phase shifters, the element antennas being configured to transmit electromagnetic waves as transmission signals and receive, as reception signals, reflected waves that are the electromagnetic waves reflected by a target, the phase shifters being configured to set phases of the transmission signals;

an antenna phase controller configured to calculate, based on a beam orientation direction and on a rotation angle of the aperture surface, phase amounts for setting appropriate phases to the phase shifters and for forming a beam of the transmission signals, and set the calculated phase amounts to the phase shifters;

a gear configured to rotate the aperture surface that is disposed through a center of an aperture enclosed by the aperture surface;

a motor configured to drive the gear to rotate the aperture surface;

an amplifier configured to drive the motor;

an antenna driving controller configured to set the rotation angle of the aperture surface to the amplifier;

an exciter configured to generate transmission signals to be transmitted from the element antennas;

a radar receiver configured to perform signal processing on the reception signals received by the element antennas;

a broadband receiver configured to receive a jamming signal and detect a received power, arrival direction, and frequency of the jamming signal;

a reflection direction calculator configured to calculate a reflection direction in which the jamming signal received by the broadband receiver is reflected by the aperture surface, based on the arrival direction and frequency of the jamming signal and arrangement information about how the element antennas are arranged; and a signal processor configured to detect the target based on the reception signals on which signal processing has been performed by the radar receiver, determine a beam orientation direction of the transmission signals and a rotation angle of the aperture surface, set the rotation angle of the aperture surface in the antenna driving controller, set the rotation angle of the aperture surface and the beam orientation direction of the transmission signals in the antenna phase controller, determine, based on the received power of the jamming signal which is detected by the broadband receiver, whether or not the jamming signal affects the target detection, and determine, when it is determined that the jamming signal affects the target detection, whether the reflection direction calculated by the reflection direction calculator matches with the arrival direction of the jamming signal received by the broadband receiver, thereby determining whether the jamming signal is a Bragg lobe signal and determining propriety of the rotation angle of the aperture surface.

15. A radar device, comprising:

an aperture surface comprising element antennas and phase shifters, the element antennas being configured to transmit electromagnetic waves as transmission signals and receive, as reception signals, reflected waves of the electromagnetic waves, the phase shifters being configured to set phases of the transmission signals;

an antenna phase controller configured to calculate, based on a beam orientation direction and on a rotation angle of the aperture surface, phase amounts for setting appropriate phases to the phase shifters and for forming a beam of the transmission signals, and set the calculated phase amounts to the phase shifters;

a gear configured to rotate the aperture surface about a central axis that is disposed through a center of an aperture enclosed by the aperture surface;

a motor configured to drive the gear to rotate the aperture surface;

an amplifier configured to drive the motor;

an antenna driving controller configured to set the rotation angle of the aperture surface to the amplifier;

an exciter configured to generate transmission signals to be transmitted from the element antennas;

a radar receiver configured to perform signal processing on the reception signals received by the element antennas;

a rotation angle setter configured to set the rotation angle of the aperture surface based on an external input;

a signal processor configured to generate image data by synthetic aperture radar (SAR) processing based on the reception signals on which signal processing has been performed by the radar receiver, detect target based on the reception signals, set the rotation angle of the aperture surface in the antenna driving controller based on the rotation angle of the aperture surface that is set by the rotation angle setter, determine a beam orientation direction of the transmission signals, and set the rotation angle of the aperture surface and the beam orientation direction of the transmission signals in the antenna phase controller; and an SAR image display unit configured to display the image data that is sent from the signal processor.

16. A radar device, comprising:

an aperture surface provided in a manner that allows the aperture surface to adjust an orientation of a direction perpendicular to the aperture surface while a polarization direction is fixed, about a central axis that is disposed through a center of an aperture enclosed by the aperture surface, and comprising element antennas and phase shifters, the element antennas being configured to transmit electromagnetic waves as transmission signals and receive, as reception signals, reflected waves that are the electromagnetic waves reflected by a target, the phase shifters being configured to set phases of the transmission signals;

a signal processor configured to detect the target based on the reception signals received by the element antennas, and determine, when there is an unnecessary electromagnetic wave, which is unnecessary in the detection of the target, the orientation of the direction perpendicular to the aperture surface and a beam orientation direction of the transmission signals so that influence of the unnecessary wave is suppressed;

an antenna phase controller configured to determine phase amounts of the transmission signals based on the orientation of the direction perpendicular to the aperture surface and the beam orientation direction which are input by the signal processor, and set the determined phase amounts to the respective phase shifters; and an antenna driving controller configured to set an orientation of the direction perpendicular to the aperture surface, based on the orientation of the direction perpendicular to the aperture surface input by the signal processor.

17. The radar device according to claim 16, further comprising a pattern calculator configured to calculate an antenna pattern based on the orientation of the direction perpendicular to the aperture surface and the beam orientation direction which are input by the signal processor, wherein the signal processor is configured to detect the target based on the reception signals received by the element antennas, determine a beam orientation direction of the transmission signals and an orientation of the direction perpendicular to the aperture surface, set the orientation of the direction perpendicular to the aperture surface in the antenna driving controller, set the orientation of the direction perpendicular to the aperture surface and the beam orientation direction of the transmission signals in the antenna phase controller, and calculate a level of cluttering that competes with the target, based on the antenna pattern calculated by the pattern calculator, to thereby determine propriety of the orientation of the direction perpendicular to the aperture surface.

18. The radar device according to claim 16, further comprising:

a broadband receiver configured to receive a jamming signal and detect a received power and arrival direction of the jamming signal; and a pattern calculator configured to calculate an antenna pattern based on the orientation of the direction perpendicular to the aperture surface and the beam orientation direction which are set by the signal processor, and calculate antenna gain in the arrival direction of the jamming signal, wherein the signal processor is configured to detect the target based on the reception signals received by the element antennas, determine a beam orientation direction of the transmission signals and an orientation of the direction perpendicular to the aperture surface, set the orientation of the direction perpendicular to the aperture surface in the antenna driving controller, set the orientation of the direction perpendicular to the aperture surface and the beam orientation direction of the transmission signals in the antenna phase controller, determine, based on the received power of the jamming signal which is detected by the broadband receiver, whether or not the jamming signal affects the target detection, and determine propriety of the orientation of the direction perpendicular to the aperture surface based on the antenna gain in the arrival direction of the jamming signal when it is determined that the jamming signal affects the target detection.

19. The radar device according to claim 16,
wherein the aperture surface comprises an aperture flat surface configured to emit and receive the electromagnetic waves that are transmitted/received by the element antennas, and
wherein the aperture flat surface is slanted with respect to the central axis.

20. The radar device according to claim 19,
wherein the aperture surface comprises:
an aperture surface portion in which the aperture flat surface is provided; and
a support portion configured to support the aperture surface portion,
wherein the support portion is configured to rotate about the central axis, and
wherein the aperture surface portion is configured to rotate about a second central axis, which is set in other directions than a direction of the central axis.

21. The radar device according to claim 20, wherein the support portion and the aperture surface portion are configured to rotate in an interlocking manner, with the support portion rotating in one rotation direction and the aperture surface portion rotating in an opposite rotation direction.

* * * * *